US012526125B2

(12) United States Patent
Hoshizuki

(10) Patent No.: US 12,526,125 B2
(45) Date of Patent: Jan. 13, 2026

(54) ENCRYPTION PROCESSING DEVICE, ENCRYPTION PROCESSING METHOD, AND ENCRYPTION PROCESSING PROGRAM

(71) Applicant: AXELL CORPORATION, Tokyo (JP)

(72) Inventor: Yusuke Hoshizuki, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 334 days.

(21) Appl. No.: 18/043,007

(22) PCT Filed: May 28, 2021

(86) PCT No.: PCT/JP2021/020522
§ 371 (c)(1),
(2) Date: Feb. 24, 2023

(87) PCT Pub. No.: WO2022/044464
PCT Pub. Date: Mar. 3, 2022

(65) Prior Publication Data
US 2024/0039693 A1 Feb. 1, 2024

(30) Foreign Application Priority Data

Aug. 31, 2020 (JP) ................................. 2020-146192
Apr. 15, 2021 (JP) ................................. 2021-069047

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC ..... H04L 9/008; H04L 9/0618; H04L 9/3093; G09C 1/00
See application file for complete search history.

(56) References Cited

U.S. PATENT DOCUMENTS 11,032,061 B2 *  6/2021  Chen ..................... H04L 9/0631
2020/0394287 A1 * 12/2020  Mucciolo ................. H04L 9/06
(Continued)

FOREIGN PATENT DOCUMENTS

CN          107864033 A        3/2018

OTHER PUBLICATIONS

Brenner, Michael, Henning Perl, and Matthew Smith. "Practical Applications of Homomorphic Encryption." SECRYPT, pp. 5-14, [ retrieved on Mar. 19, 2025]. Retrieved from the internet: <URL: https://www.scitepress.org/PublishedPapers/2012/39694/39694.pdf> ( Year: 2012).*

(Continued)

*Primary Examiner* — Hany S. Gadalla
(74) *Attorney, Agent, or Firm* — MASUVALLEY & PARTNERS; Peter Martinez

(57) ABSTRACT

To speed up an operation by a full adder that achieves full homomorphic encryption, a ciphertext processed by an encryption processing device has two values as a plaintext and is a ciphertext of fully homomorphic encryption that allows various operations to be performed by performing a logical operation without performing decryption. The encryption processing device includes an operation unit that performs a logical operation for a ciphertext received by a receiving unit and an output unit that outputs a result of the operation by the operation unit. The operation unit reduces the number of logical operations (homomorphic operations) by temporarily using a specific ciphertext that can have multiple values as a plaintext.

10 Claims, 6 Drawing Sheets

(56) References Cited

U.S. PATENT DOCUMENTS

2021/0019428 A1\* 1/2021 Liu .......................... H04L 9/008
2021/0165633 A1\* 6/2021 Guilley ................... G06F 7/508

OTHER PUBLICATIONS

WIPO, Japan International Search Authority, International Search Report (with English translation) and Written Opinion mailed Aug. 10, 2021 in International Patent Application No. PCT/JP2021/020522, 10 pages.
Chillotti, I et al., "Fast Fully Homomorphic Encryption over the Torus," *Journal of Cryptology*, 33:34-91, 2020, 62 pages.
Sugiyama, S. et al., "Algorithm and Architecture Design for Fully Homomorphic Encryption Hardware," *IEICE Technical Report*, vol. 119, No. 443, 2020, pp. 285-290, 8 pages.

\* cited by examiner

ENCRYPTION PROCESSING DEVICE, ENCRYPTION PROCESSING METHOD, AND ENCRYPTION PROCESSING PROGRAM

RELATED APPLICATIONS

This application is the U.S. National Phase of and claims priority to International Patent Application No. PCT/JP2021/020522, International Filing Date May 28, 2021, entitled Encryption Processing Device, Encryption Processing Method, And Encryption Processing Program; which claims benefit of Japanese Application No. JP2020-146192 filed Aug. 31, 2020; and which claims benefit of Japanese Application No. JP2021-069047 filed Apr. 15, 2021; all of which are incorporated herein by reference in their entireties.

FIELD

The present invention relates to an encryption processing device, an encryption processing method, and an encryption processing program that process a ciphertext.

BACKGROUND

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

Additive homomorphic encryption and multiplicative homomorphic encryption have been conventionally known in which while a finite cyclic group is regarded as an integer, only an additive operation (addition and subtraction) and a multiplicative operation (multiplication) are performed, respectively.

Since the finite cyclic group can be multiplied by an integer by repeating addition, a "plaintext" can be multiplied by an integer, and the "plaintext" can be exponentiated by repeating multiplication.

There is also known fully homomorphic encryption (FHE) that allows both an additive operation (addition and subtraction) and a multiplicative operation (multiplication) to be performed while ciphertexts remain encrypted.

Fully homomorphic encryption known at present uses somewhat homomorphic encryption, for example, based on the LWE problem, which allows addition/subtraction and multiplication to be performed multiple times. When being based on the LWE problem, somewhat homomorphic encryption is configured by adding a small error to a plaintext in an encryption process to such an extent that there is no problem in decryption. Somewhat homomorphic encryption is not limited to LWE encryption.

In somewhat homomorphic encryption based on the LWE problem, an error is accumulated as an operation is performed, and therefore bootstrapping for reducing an error component while the error component remains encrypted is performed before the error becomes too large to be decrypted.

Such bootstrapping requires an enormous amount of data and an enormous amount of calculation. Therefore, it cannot be said that fully homomorphic encryption has been realized in a practical sense.

A method for drastically improving this problem is TFHE (Fast Fully Homomorphic Encryption over the Torus) described in Non-Patent Literature 1 (referred to as the aforementioned paper in the following descriptions).

CITATION LIST

Non-Patent Literature

Non-patent Literature 1: TFHE: Fast Fully Homomorphic Encryption over the Torus. Journal of Cryptology, 33:34-91, 2020, I.Chillotti, N.Gama, M.Georgieva, and M.Izabachene

SUMMARY

Technical Problem

Homomorphic encryption includes Bit-wise type homomorphic encryption having two values as a plaintext and based on a logical operation, and Integer-wise type homomorphic encryption having an integer as a plaintext as one ciphertext. TFHE described in Non-Patent Literature 1 is the Bit-wise type.

In Bit-wise type homomorphic encryption, it is necessary to process 32 ciphertexts in order to handle, for example, a 32-bit integer because one ciphertext can only have 1 bit of information.

Addition, subtraction, multiplication, and comparison between integers are frequently used in various data processing. In a case of using a ciphertext having 1 bit of information, an operation is performed with a concept for designing a logic circuit. In addition and subtraction of 32-bit integers, one half adder and 31 full adders are used. In multiplication, full adders the number of which is near 32 squared (1024) are used.

Therefore, in order to reduce the processing time of fully homomorphic encryption and further improve the efficiency, it is necessary to enhance the speed of an operation by a full adder including bootstrapping.

The present invention has been achieved in view of the above circumstances, and an object of one aspect of the present invention is to enhance the speed of an operation by a full adder required for fully homomorphic encryption and to reduce the processing time of the fully homomorphic encryption.

Solution to Problem

The present invention is an encryption processing device that processes a ciphertext, where the ciphertext is a ciphertext of fully homomorphic encryption that allows a logical operation without decrypting the ciphertext, the ciphertext having two values as a plaintext, and in a predetermined operation using the ciphertext, the number of times of computation required for the operation is reduced by using a multi-value logical operation that outputs a temporary ciphertext based on the ciphertext and having multiple values more than two values as a plaintext.

Advantageous Effects of Invention

According to one aspect of the present invention, it is possible to enhance the speed of an operation by a full adder and to reduce the processing time of fully homomorphic encryption.

DESCRIPTION OF EMBODIMENTS

An embodiment of the present invention is described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value logical operation.

An encryption processing device of the present embodiment performs an operation of fully homomorphic encryption by using a full adder. Fully homomorphic encryption is encryption that allows addition, subtraction, and multiplication to be performed in a homomorphic manner (i.e., while data subjected to an operation remains encrypted).

It is known that an AND circuit unit and an XOR circuit unit that configure the full adder included in the encryption processing device respectively perform an operation for obtaining AND and an operation for obtaining XOR for encrypted data encrypted by Bit-wise type homomorphic encryption.

However, in order to achieve fully homomorphic encryption, it is necessary to perform a process of reducing an error, which is called Gate Bootstrapping and will be described below, after the operation for obtaining AND or the operation for obtaining XOR.

Although this process called Gate Bootstrapping requires time, the encryption processing device of the present embodiment reduces the number of times of homomorphic operations configuring the full adder by increasing the number of the types of possible values of a temporary ciphertext after Gate Bootstrapping.

Accordingly, the encryption processing device of the present embodiment can reduce the number of times of Gate Bootstrapping performed in the latter stage of each homomorphic operation, thereby enhancing the speed of an operation by the full adder.

Figure 1:
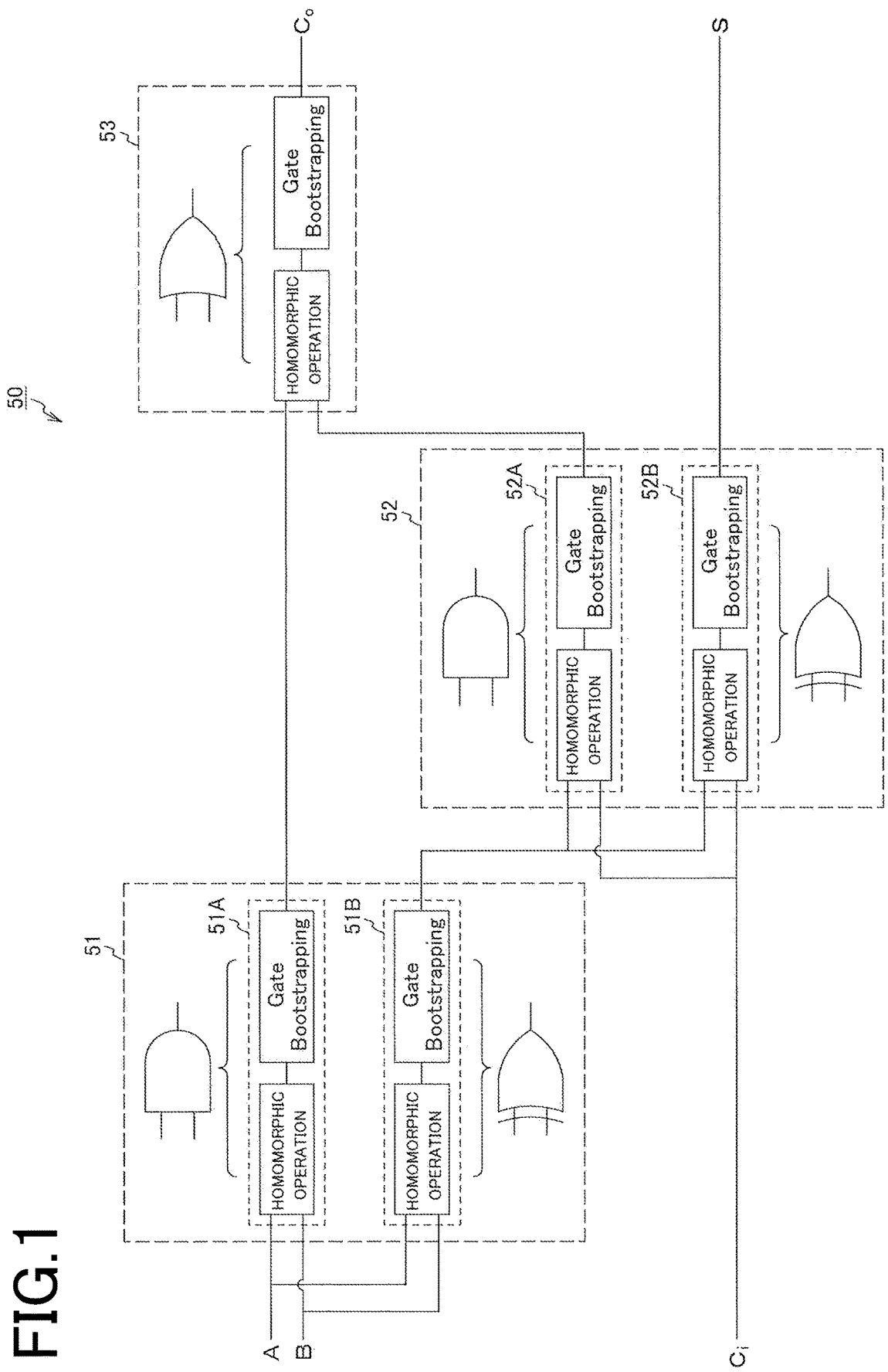
FIG. 1 is an explanatory diagram of a configuration of a full adder circuit configured by the minimum number of logical operation elements.

FIG. 1 is a diagram illustrating an example of a full adder circuit configured by the minimum number of logical operation elements.

Although FIG. 1 illustrates a full adder as a hardware circuit configured by logical operation elements, the full adder may be considered as a full adder program to be executed by a software implemented by a CPU.

When the full adder is implemented by software, an operation is performed with a concept of designing a logic circuit (a logic gate) for a ciphertext.

This description can also be applied to the encryption processing device of the present embodiment described with reference to FIG. 2 and subsequent drawings.

A full adder circuit 50 is configured by two half adders 51 and 52 and an OR circuit unit (an arithmetic processing unit for obtaining OR) 53.

The first half adder 51 includes an AND circuit unit (an arithmetic processing unit for obtaining AND) 51A and an XOR circuit unit (an arithmetic processing unit for obtaining XOR) 51B.

The second half adder 52 includes an AND circuit unit 52A (an arithmetic processing unit for obtaining AND) and an XOR circuit unit (an arithmetic processing unit for obtaining XOR) 52B.

Inputs A and B to be added to each other are input to the AND circuit unit 51A and the XOR circuit unit 51B of the first half adder 51.

An output of the AND circuit unit 51A of the first half adder 51 and an output of the AND circuit unit 52A of the second half adder 52 are input to the OR circuit unit 53 in the latter stage, and a carry output $C_o$ (Carry out) is output from the OR circuit unit 53.

An output from the XOR circuit unit 51B of the first half adder 51 and a carry input $C_i$ (Carry in) are input to the AND circuit unit 52A and the XOR circuit unit 52B of the second half adder 52.

An output S (Sum) of the full adder circuit 50 is output from the XOR circuit unit 52B of the second half adder 52.

As illustrated in FIG. 1, the full adder 50 includes two AND circuit units, two XOR circuit units, and an OR circuit unit and therefore includes five logical operation elements (processing units corresponding to the logical operation elements) in total.

Therefore, an operation by one full adder requires the operation time corresponding to the five logical operation elements. In TFHE described in the aforementioned paper, an operation by one logical operation element requires an operation time of about 16 ms, and the whole full adder 50 including five logical operation elements requires an operation time of about 80 ms. When such a full adder is used for an operation of fully homomorphic encryption by TFHE, Gate Bootstrapping has to be performed in the latter stage of an operation (a homomorphic operation) performed in a first stage of each of the five logical operation elements. Gate Bootstrapping occupies almost all the processing time of a homomorphic logical operation.

Therefore, an operation of fully homomorphic encryption by the full adder circuit 50 in FIG. 1 can be considered as requiring the operation time corresponding to five times of Gate Bootstrapping.

An operation by each AND circuit unit and an operation by each XOR circuit unit in the half adder 51 and the half adder 52 have no dependence on each other. Therefore, in a case of configuring the full adder by software, operations can be performed in parallel in a multithreading manner, for example.

Performing operations in parallel enables an operation by a half adder to be performed in the operation time corresponding to one logical operation element.

Therefore, the operation by the one full adder illustrated in FIG. 1 can be performed in the operation time corresponding to three logical operation elements.

However, the operation by one full adder requires an operation time of 48 ms even in this case. This time is substantially the same as the operation time required for performing Gate Bootstrapping three times.

TFHE is Bit-wise type encryption that is based on a logic gate such as an AND circuit unit or an XOR circuit unit.

By using a full adder, all of addition, subtraction, multiplication, and division (four arithmetic operations) of an integer and a comparison operation can be handled.

However, in Bit-wise type encryption, one ciphertext can only have 1 bit of information.

Addition, subtraction, multiplication, division, and comparison (comparison is equivalent to whether a result of subtraction is positive or negative) between integers are frequently used in various types of data processing, and handled data usually has a large bit length.

For example, it is necessary to process 32 ciphertexts in order to handle a 32-bit integer.

When addition or subtraction is performed for 32-bit integers, as for Bit-wise type fully homomorphic encryption, one half adder and 31 full adders are used. In multiplication, full adders the number of which is near 32 squared (1024) are used.

In order to make an operation (four arithmetic operations and comparison) of fully homomorphic encryption more practical, it is important to further enhance the speed of an operation by a full adder frequently used for the operation of fully homomorphic encryption.

As described below, the encryption processing device of the present embodiment reduces the number of times of homomorphic operations by making improvement, in particular, in a full adder used for an operation of fully homomorphic encryption, so as to allow Gate Bootstrapping performed for each operation to output multiple values.

As a result, the encryption processing device of the present embodiment can reduce the number of times of Gate Bootstrapping that requires a long operation time in the latter stage of a homomorphic operation and can largely reduce a processing time of fully homomorphic encryption.

Figure 2:
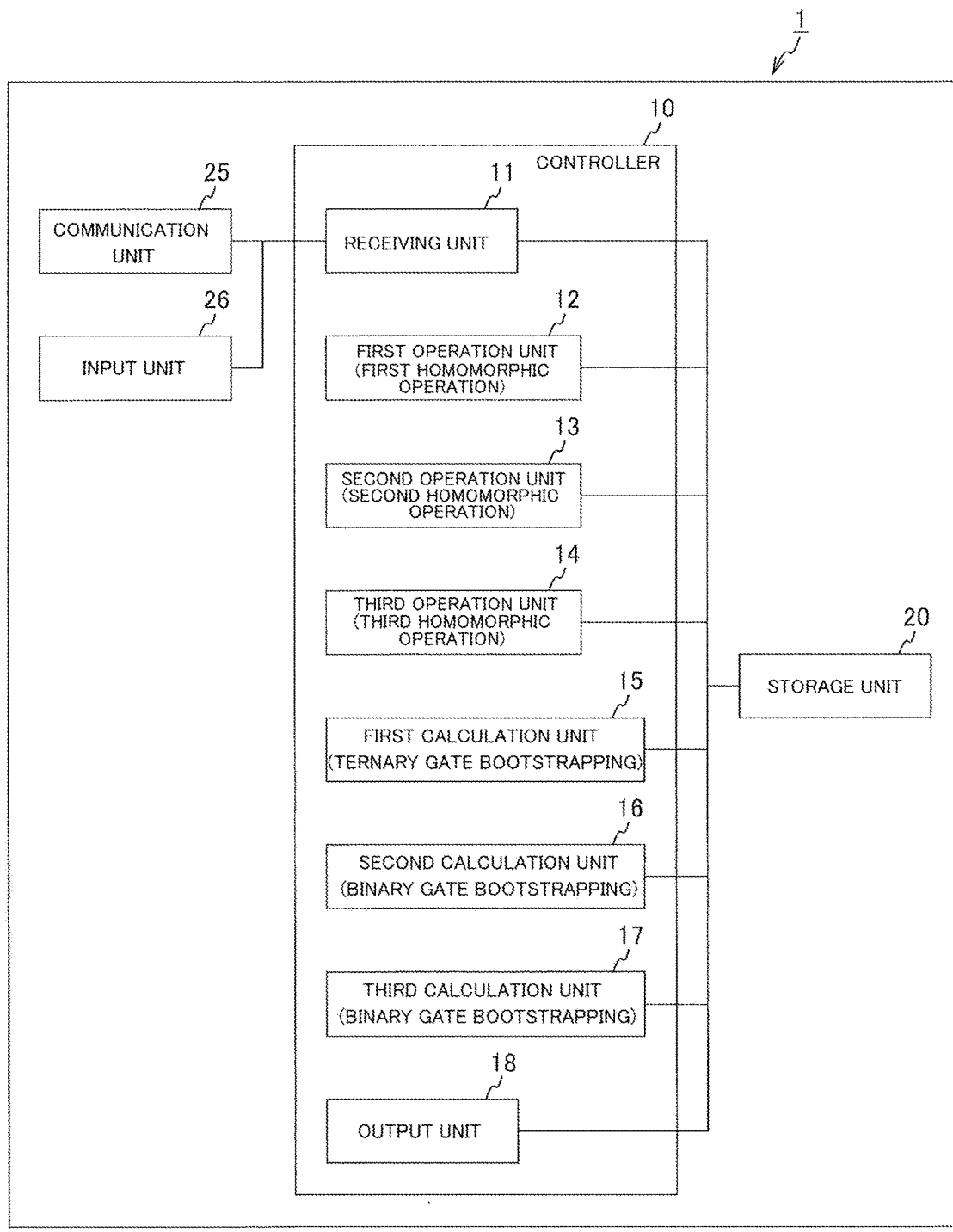
FIG. 2 is an explanatory diagram of a functional configuration of an encryption processing device of the present embodiment.

FIG. 2 is an explanatory diagram of a functional configuration of the encryption processing device of the present embodiment.

An encryption processing device 1 includes a controller 10, a storage unit 20, a communication unit 25, and an input unit 26.

The controller 10 includes a receiving unit 11, a first operation unit 12, a second operation unit 13, a third operation unit 14, a first Bootstrapping unit (a first calculation unit) 15, a second Bootstrapping unit (a second calculation unit) 16, a third Bootstrapping unit (a third calculation unit) 17, and an output unit 18.

The receiving unit 11 receives input of a ciphertext that is an object of an operation, via the communication unit 25 and the input unit 26.

The first operation unit 12 performs a first homomorphic operation for the input ciphertext received by the receiving unit 11.

The second operation unit 13 performs a second homomorphic operation for a temporary ciphertext, described later, output from the first Bootstrapping unit 15 and a ciphertext of the carrier input.

The third operation unit 14 performs a third homomorphic operation for the temporary ciphertext, described later, output from the first Bootstrapping unit 15 and the ciphertext of the carrier input.

The first, second, and third operation units 12, 13, and 14 are arithmetic processing units each of which implements an operation (a homomorphic operation) by a full adder configured by the logic gates (the AND circuit unit and the XOR circuit unit) described in FIG. 1, by software. At least one of the first, second, and third operation units 12, 13, and 14 may be implemented by hardware.

The first Bootstrapping unit 15 performs a ternary Gate Bootstrapping process, which will be described later, for the result of the operation by the first operation unit 12 and outputs the temporary ciphertext that can have three values.

The second Bootstrapping unit 16 performs a binary Gate Bootstrapping process, which will be described later, for the result of the operation by the second operation unit 13 and outputs the carry output $C_o$ as a new ciphertext that can have two values.

The third Bootstrapping unit 17 performs a binary Gate Bootstrapping process, which will be described later, for the result of the operation by the third operation unit 14 and outputs the output S as a new ciphertext that can have two values.

The output unit 18 outputs a final operation result to outside of the encryption processing device 1 or to another processing process performed in the encryption processing device 1.

The storage unit 20 can store therein an input ciphertext, a temporary file and temporary data used in an operation by a full adder, and an output ciphertext.

An encrypted encryption database 60 can also be stored in the storage unit 20.

The communication unit 25 connects the encryption processing device 1 to a network, thereby enabling communication between the encryption processing device 1 and an external device.

The encryption processing database 1 can serve as a database server by storing the encrypted encryption database 60 in the storage unit 20 and including the communication unit 25. In this case, the encryption processing device 1 can receive an encrypted query from a terminal device as the external device, search the encrypted encryption database 60, and send an encrypted search result to the terminal device.

The input unit 26 inputs a ciphertext that is an object of arithmetic processing to the encryption processing device 1.

Figure 3:
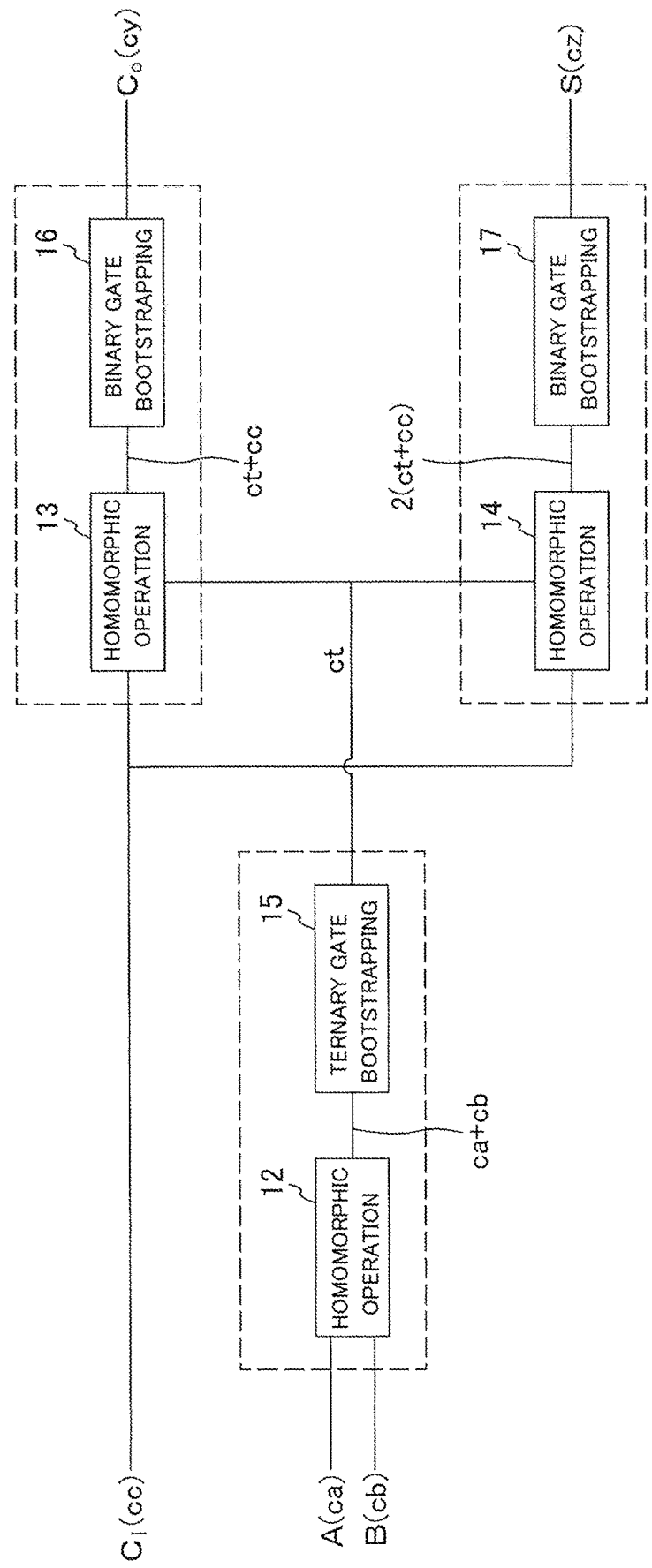
FIG. 3 is a more detailed explanatory diagram of an operation process by a full adder based on the functional configuration in FIG. 2.

FIG. 3 is a more detailed explanatory diagram of an operation process by a full adder based on the functional configuration in FIG. 2.

In the description of FIG. 3, ciphertexts ca, cb, and cc input to the encryption processing device 1 are all TLWE ciphertexts described in the aforementioned paper.

TLWE encryption is Bit-wise type fully homomorphic encryption that has 0 or a value μ (non-0) as a plaintext, which will be described in detail below.

Various operations can be performed by logical operations using logic gates.

The encryption processing device 1 uses a ciphertext that can have multiple values (for example, three values) as a plaintext temporarily, thereby being able to reduce the number of logical operations (homomorphic operations) and to largely reduce a processing time of fully homomorphic encryption.

The three possible values of the temporary ciphertext are temporal values in a full adder as a whole. However, those values are used in a logical operation (a multi-value logical operation) by each logic gate and are not temporal values in the logical operation.

The configuration illustrated in FIG. 3 uses ternary Gate Bootstrapping obtained by improving (binary) Gate Bootstrapping presented in the paper of Non-Patent Literature 1 (the aforementioned paper) to be able to output three values.

Gate Bootstrapping in TFHE presented in the aforementioned paper will be described in detail below.

The input ciphertexts ca and cb are input to the first operation unit 12 and are subjected to a homomorphic operation, and the operation result (a ciphertext ca+cb) is input to the first Bootstrapping unit 15 that performs ternary Gate Bootstrapping.

An output of binary Gate Bootstrapping in the aforementioned paper is a ciphertext that can have either one of two values $(0, \mu)$ as a plaintext. Meanwhile, an output of ternary Gate Bootstrapping in the present embodiment is a temporary ciphertext ct that can have either one of three values $(0, \mu_1, \mu_2)$ as a plaintext.

The temporary ciphertext ct that is the output of ternary Gate Bootstrapping is input to the second operation unit 13 and the third operation unit 14 to be added to a ciphertext cc of the carry input $C_i$.

The output of the second operation unit 13 is input to the second Bootstrapping unit 16 and is subjected to binary Gate Bootstrapping, and a ciphertext cy of the carry output $C_o$ is output.

The output of the third operation unit 14 is input to the third Bootstrapping unit 17 and is subjected to binary Gate Bootstrapping, and a ciphertext cz of the output S is output.

A time required for the homomorphic operation by the second operation unit 13 and a time required for the homomorphic operation by the third operation unit 14 are very short.

Gate Bootstrapping consumes almost all the processing time when processing is performed by a full adder using a homomorphic operation.

In a case of performing an operation by a full adder using binary Gate Bootstrapping as in the full adder circuit 50 illustrated in FIG. 1, it is necessary to carry out Gate Bootstrapping once in the latter stage in each of the AND circuit units 51A and 52A, the XOR circuit units 51B and 52B, and the OR circuit unit 53, i.e., five times in total.

Meanwhile, the encryption processing device 1 uses ternary Gate Bootstrapping by the first Bootstrapping unit in an operation by a full adder, thereby reducing the number of times of homomorphic operation processing to three in total.

Consequently, the encryption processing device 1 can reduce the number of times of Gate Bootstrapping that occupies almost all the homomorphic operation processing to three in total. Therefore, the encryption processing device 1 can reduce a computing time by about 40%, as compared with the full adder circuit 50 illustrated in FIG. 1.

Further, the encryption processing device 1 may perform processing by the second operation unit 13 and the second Bootstrapping unit 16 and processing by the third operation unit 14 and the third Bootstrapping unit 17 in parallel to each other by multithreaded processing. In this case, the encryption processing device 1 can reduce the number of stages of Bootstrapping that occupies most of the processing time of an operation by a full adder to two. Meanwhile, in the full adder circuit 50 illustrated in FIG. 1, the AND circuit unit 51A and the XOR circuit unit 51B can be caused to operate in parallel, and the AND circuit unit 52A and the XOR circuit unit 52B can be caused to operate in parallel. However, the number of the stages of Bootstrapping is three as a whole. Therefore, also in a case of using parallel processing, the encryption processing device 1 can reduce a computing time by about 33%, as compared with the full adder circuit 50 illustrated in FIG. 1.

As described above, since Gate Bootstrapping occupies almost all the operation time of a full adder related to fully homomorphic encryption, the encryption processing device 1 can remarkably enhance the speed of an operation by the full adder by reducing the number of times of Gate Bootstrapping.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition or multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a modification of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 4:
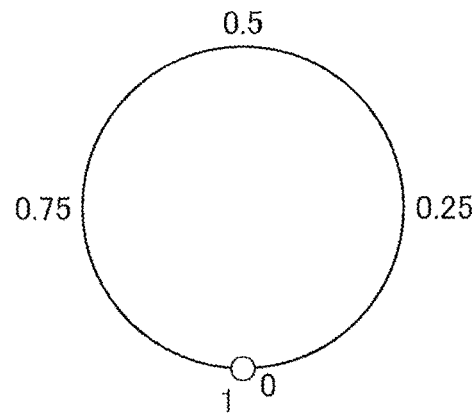
FIG. 4 is an image diagram for explaining a circle group that TLWE encryption has as a plaintext.

FIG. 4 is an image diagram for explaining a circle group that TLWE encryption has as a plaintext.

TLWE encryption has a real number p, as a plaintext, that moves forward from 0 with a real number precision and, when reaching 1, returns to 0 and that corresponds to a point 0 on a circle group {T} illustrated in FIG. 4 or any point (non-0) other than 0 on the circle group {T}. TLWE encryption itself regards any point on a circle group as a plaintext, and uses a range near 0 (including an error) and a range near $\mu$ (including an error) as a plaintext.

The point on the circle group {T} is also described as an "element" in the present specification.

An encryption processing device handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] obtained by collecting N random numbers uniformly distributed is prepared as an element on the circle group {T}. In addition, a private key [s] obtained by collecting N values that can be 0 or 1 is prepared.

Assuming that a random number in the Gaussian distribution (the normal distribution) in which an average value is a plaintext $\mu$ and a variance is preset to $\alpha$ is e, an example of a TLWE ciphertext is a pair $([a], [s] \cdot [a]+e)$.

An average value of e when an infinite number of TLWE ciphertexts are created for the same plaintext $\mu$ is a plaintext $\mu$, where $\mu$ is a plaintext without an error and e is a plaintext with an error.

Symbol "·" represents a dot product of vectors. This description is also applied to the following descriptions.

When $[s] \cdot [a]+e$ described above is written as b, the TLWE ciphertext can be represented as $([a], b)$.

A function $\varphi_s(([a], b)) = b - [s] \cdot [a] = e$ is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When $([a]+[a'], b+b')$ obtained by adding two TLWE ciphertexts $([a], b)$ and $([a'], b')$ together as they are is input to the aforementioned decryption function $\varphi_s$, a sum of the two plaintexts is obtained as represented by $\varphi_s(([a]+[a'], b+b'))=(b+b')-[s]\cdot([a]+[a'])=(b-[s]\cdot[a])+(b'-[s]\cdot[a'])=\varphi_s([a], b)+\varphi_s([a'], b')$.

It is thus found that a TLWE ciphertext is a ciphertext obtained by "additive homomorphic encryption".

In TFHE in the aforementioned paper, various operations are achieved by repeating "performing an additive operation for TLWE ciphertexts each obtained by adding an error to a plaintext and reducing an error by Gate Bootstrapping".

In the following descriptions, a "trivial ciphertext" such as $([0], \mu)$ is a TLWE ciphertext that can be decrypted with any private key, that is, a ciphertext that can be decrypted with any private key to provide the same plaintext.

In $([0], \mu)$, $[0]$ represents a zero vector.

Although the "trivial ciphertext" can be handled as a TLWE ciphertext, it can be considered as a state where a plaintext is placed in the ciphertext substantially as it is.

When the decryption function cps is applied to the TLWE ciphertext $([0], \mu)$, the private key $[s]$ is multiplied by the zero vector $[0]$ to disappear as represented by $\varphi_s(([0], \mu))=\mu-[s]\cdot 0=\mu$. The plaintext $\mu$ is thus obtained easily. Such a ciphertext is a trivial ciphertext with regard to the plaintext $\mu$.

A "finite cyclic group" used in Gate Bootstrapping in TFHE is described.

Gate Bootstrapping uses "factor ring of polynomial ring" as a finite cyclic group.

The following description explains that "factor ring of polynomial ring" is a finite cyclic group.

An n-th degree polynomial is generally represented by $a_n X^n + a_{n-1} X^{n-1} + \ldots + a_0$.

These all sets form a commutative group for a sum of polynomials $f(x)+g(x)$.

Further, a product of polynomials $f(x)g(x)$ has properties identical to those of the commutative group except that an inverse element is not necessarily present. Such a structure is called "monoid".

Regarding the sum and the product of polynomials, the distributive property is established as follows.

$$f(x)\{g(x)+g'(x)\}=f(x)g(x)+f(x)g'(x)$$

Therefore, when the sum and the product of polynomials are defined using polynomials as elements, a "ring" is formed, which is called "polynomial ring".

TFHE uses a polynomial ring including the circle group $\{T\}$ that is a finite cyclic group as coefficients, and such a polynomial ring is represented as $T[X]$.

When a polynomial $T(X)$, which is a polynomial ring, is decomposed into $T[X](X^n+1)+T[X]$, and only remainders are extracted and collected, "factor ring of polynomial ring" is obtained because the remainders also form a "ring".

In TFHE, "factor ring of polynomial ring" is represented as $T[X]/(X^n+1)$.

A polynomial $F(X)=\mu X^{n-1}+\mu X^{n-2}+ \ldots +\mu X+\mu$ is extracted by using a desired coefficient $\mu$ ($\mu \in T$) as an element of the "factor ring of polynomial ring" $T[X]/(X^n+1)$.

When the element $F(X)$ of the factor ring of a polynomial ring is multiplied by X, $\mu X^{n-1}+\mu X^{n-2}+ \ldots +\mu X-\mu$ is obtained, the coefficient of the top term appears as a constant term with a sign reversed from positive to negative.

When multiplication by X is further performed, the same phenomenon happens again as represented by $\mu X^{n-1}+\mu X^{n-2} \ldots +\mu X^2-\mu X-\mu$ (the coefficient of the top term appears as a constant term with a sign reversed from positive to negative).

When this multiplication is repeated n times, $-\mu X^{n-1}-\mu X^{n-2} \ldots -\mu X-\mu$ is obtained, so that the coefficients of all terms become negative.

When multiplication by X is further continued, the coefficient of the top term appears as a constant term with a sign reversed from negative to positive, as represented by $$-\mu X^{n-1}-\mu X^{n-2} \ldots -\mu X+\mu,$$

$$-\mu X^{n-1}-\mu X^{n-2} \ldots +\mu X+\mu.$$

When multiplication by X is repeated 2n times in total, the multiplication result returns to the original element of the factor ring of a polynomial ring, $F(X)=\mu X^{n-1}+\mu X^{n-2}+ \ldots +\mu X+\mu$. As described above, the highest-order coefficient $(\mu)$ appears as the lowest-order constant term with a reversed sign $(-\mu)$, and terms are shifted by one in whole.

That is, the polynomial $F(X)=\mu X^{n-1}+\mu Xn^{-2}+ \ldots +\mu X+\mu$ is a finite cyclic group of order 2n in a ring that is the "factor ring of polynomial ring" $T[X]/(X^n+1)$.

In TFHE, an encryption processing device achieves fully homomorphic encryption by using such properties of the polynomial $F(X)$ based on "factor ring of polynomial ring".

[TRLWE Encryption]

Gate Bootstrapping uses encryption called "TRLWE encryption" in addition to TLWE encryption.

TRLWE encryption is described.

The character "R" in TRLWE encryption means a "ring", and TRLWE encryption is LWE encryption configured by a "ring". TRLWE is also additive homomorphic encryption, as TLWE encryption is.

A "ring" in TRLWE encryption is the "factor ring of polynomial ring" $T[X]/(X^n+1)$ described above.

In order to obtain TRLWE encryption, elements of the "factor ring of polynomial ring" $T[X]/(X^n+1)$ are selected at random.

In fact, n coefficients in an (n−1)th degree polynomial are selected as uniformly distributed random numbers from the circle group $\{T\}$.

When the degree of the polynomial is n−1, the polynomial is not divided by $X^n+1$, and it is not necessary to consider a remainder. Therefore, it is assumed that the (n−1)th degree polynomial is a polynomial $a(X)$.

A polynomial $s(X)$ used as a private key is structured as follows, by collecting n values each of which can be 0 or 1 at random.

$$s(X)=s_{n-1}X^{n-1}+s_{n-2}X^{n-2}+ \ldots s_1 X+s_0$$

Assuming that n random numbers $e_i$ are random numbers in the Gaussian distribution (the normal distribution) in which an average value is a plaintext $\mu_i$ and a variance is $\alpha$, the following polynomial $e(X)$ is structured from these random numbers.

$$e(X)=e_{n-1}X^{n-1}+e_{n-2}X^{n-2}+ \ldots e_1 X+e_0$$

Decomposition of $s(X) \cdot a(X) + e(X)$ is performed into $f(X)(X^n+1) + b(X)$, and $b(X)$ is obtained.

Consequently, $(a(X), b(X))$ is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, $g(X)$ is determined in such a manner that cps becomes an element of $T[X]/(X^n+1)$ serves as a decryption function, where $cps((a(X), b(X)) = b(X) - s(X) \cdot a(X) + g(X)(X^n+1)$, as in TLWE encryption.

[Gadget Decomposition]

Gadget Decomposition is described.

A coefficient in a polynomial used in a TRLWE ciphertext is a real number that is an element of the circle group $\{T\}$ in FIG. 4 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial $F(X)$ of a TRLWE ciphertext is 2, one unit of decomposition is $Bg=2^2$, and decomposition into $l=3$ elements is performed. At this time, each element is arranged to enter between $-Bg/2$ and $Bg/2$.

A TRLWE ciphertext is a combination of two polynomials like $(a(X), b(X))$ as described above. Therefore, a TRLWE ciphertext d can be written as $$d = [0.75X^2 + 0.125X + 0.5, 0.25X^2 + 0.5X + 0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1} = 0.25$.

Since $0.75 = -0.25$ is established on the circle group $\{T\}$, decomposition can be performed as follows.

$$d = [0.75X^2 + 0.125X + 0.5, \ 0.25X^2 + 0.5X + 0.375]$$
$$= [-0.25X^2 + 0.125X + 0.5, \ 0.25X^2 + 0.5X + 0.25 + 0.125]$$
$$= [0.25 \times (-X^2 + 2) + 0.25^2 \times 2X + 0.25^3 \times 0,$$
$$0.25 \times (X^2 + 2X + 1)9 + 0.25^2 \times 2 + 0.25^3 \times 0]$$

Therefore, when Gadget Decomposition is performed, a vector $$\text{Dec}(d) = [-X^2+2, 2X, 0, X^2+2X+1, 2, 0]$$

is obtained.

An operator H of inverse transform from a vector to a ciphertext is also defined.

When the description is provided based on the example described above, a matrix $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of inverse transform. A TRLWE ciphertext d' is obtained by performing an operation $\text{Dec}(d) \cdot H$. The lower bits are rounded off.

It can also be said that an operation of obtaining $[v]$ that makes $\|d - [v] \cdot H\|$ minimum with respect to the TRLWE ciphertext d is Gadget Decomposition. Here, $|\ |$ is a vector norm (length).

Ciphertexts $Zi = (a(X), b(X))$ formed by polynomials in which all coefficients of $e(X)$ have an average value of 0 and a variance is $a$ are created. The number of the created ciphertexts is 2l.

The plaintext $\mu$ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

This ciphertext k is defined as a TRGSW ciphertext BK.

The TRGSW ciphertext BK configures a Bootstrapping Key used below.

The Bootstrapping Key is described.

The Bootstrapping Key is used for encrypting a private key in order to use the private key in Gate Bootstrapping.

Separately from the private key $[s]$ (Nth degree) used for TLWE ciphertexts, each element of a private key $[s']$ for encrypting the private key $[s]$ is selected to be either of two values, i.e., 0 or 1 for use in Gate Bootstrapping.

It is necessary to make the degree of the private key $[s']$ the same as the degree n of polynomials used in TRLWE encryption.

The TRGSW ciphertext BK is created for each element of the private key $[s]$.

When decryption with the private key $[s']$ is performed, 2l TRLWE ciphertexts Zj are created where $\varphi_s'(Zj) = 0$ is satisfied.

$BK_i$ is then represented by $$BK_i = \begin{pmatrix} Z_1 \\ Z_2 \\ \vdots \\ Z_{2\ell} \end{pmatrix} + s_i \cdot H$$

as in the above-described configuration of the TRGSW ciphertext.

N TRGSW ciphertexts having this configuration are prepared, where N is the same as the degree of the private key $[s]$. A set of the thus prepared TRGSW ciphertexts is referred to as a Bootstrapping Key.

A cross product of the TRGSW ciphertext BKi and the TRLWE ciphertext d is defined as follows.

$$BKi \times d = \text{Dec}(d) \cdot BKi.$$

Gadget Decomposition is an operation of obtaining $[v]$ that makes $\|d - [v] \cdot H\|$ minimum with respect to the TRLWE ciphertext d.

Therefore, by using $[v] = \text{Dec}(d)$ and an error $(\varepsilon_a(X), \varepsilon_b(X))$, $[v] \cdot H = d + (\varepsilon_a(X), \varepsilon_b(X))$ can be written.

As a result, $$BKi \times d = \text{Dec}(d) \cdot BKi = \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates a dot product, and $[v]\cdot H = d + (\varepsilon_a(X), \varepsilon_b(X))$ is substituted into the right side, $$\sum_{j=1}^{2\ell} v_j \times Z_j + s_i \times (d + (\in_a(X), \in_b(X)))$$

$$= \sum_{j=1}^{2\ell} v_j \times Z_j + s_i \times d + s_i \times (\in_a(X), \in_b(X))$$

is obtained, and becomes the same as calculation of a sum of the following three ciphertexts c1, c2, and c3.

$$c_1 = \sum_{j=1}^{2\ell} v_j \times Z_j$$

$$c_2 = s_i \times d$$

$$c_3 = s_i \times (\in_a(X), \in_b(X))$$

Since TRLWE encryption is additive homomorphic encryption, calculating a sum of ciphertexts is the same as calculating a sum of plaintexts.

Since $c_1$ is obtained by adding several times of $Z_j$, an expected value of the plaintext $\varphi_s'(c_1)$ is 0.

In addition, $\varphi_s'(c_3)$ obtained by decryption is set to be sufficiently small also in the subsequent operations, because the magnitude of the absolute value of a plaintext can be limited by a system parameter.

In this case, $\varphi_s'(BKi \times d) = \varphi_s'(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintexts $\mu_0$ and $\mu_1$, when $d_1 - d_0$ is substituted for d, and $d_0$ is finally added, the following CMux function is completed.

$$CMux(BK_i, d_0, d_1) = BKi \times (d_1 - d_0) + d_0 = Dec(d_1 - d_0) \cdot BK_i + d_0$$

The CMux function outputs a ciphertext of the plaintext $\mu_0$ without decrypting the ciphertext when $s_i$ is 0, and outputs a ciphertext of the plaintext $\mu_1$ without decrypting the ciphertext when $s_i$ is 1.

Although the CMux function can calculate the ciphertext of the plaintext $\mu_0$ or the plaintext $\mu_1$, it is not possible to know which one is selected.

Binary Gate Bootstrapping in TFHE is performed using the various information described above.

Binary Gate Bootstrapping is configured by three steps described below, i.e., (1) BlindRotate, (2) SampleExtract, and (3) KeySwitching.

Figure 5:
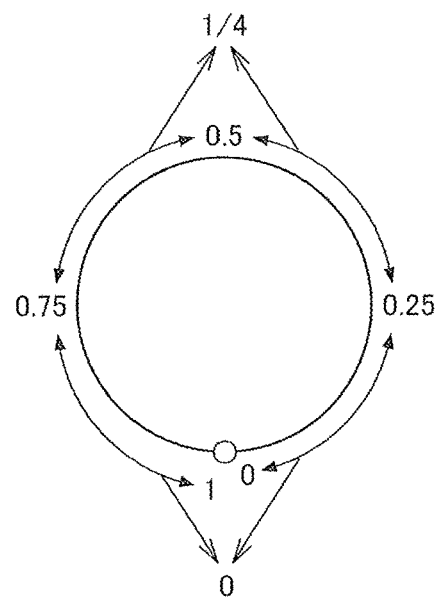
FIG. 5 is an operation image diagram of binary Gate Bootstrapping.

FIG. 5 is an operation image diagram of binary Gate Bootstrapping.

Binary Gate Bootstrapping reduces an error for a plaintext included in a result of a homomorphic operation between TLWE ciphertexts by three steps described below.

In the following descriptions, unless otherwise specified, a "plaintext" means a result of an operation between plaintexts obtained as a result of an operation between TLWE ciphertexts.

A plaintext in a section from 0 to 0.25 (¼) or 0.75 (¾) to 1 on the circle group $\{T\}$ in FIG. 4 is converted to a TLWE ciphertext 0, and a plaintext in a section from (¼) to 0.75 (¾) is converted to a ciphertext 0.25 (¼).

An error added to the plaintext in this conversion is any error in a range of ±¹⁄₁₆.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, $\varphi_s(c')$ is a plaintext obtained by applying a decryption function to the following LWE ciphertext c'.

In BlindRotate, the following polynomial T(X)

$$T(X) = F(X) \cdot X^{n/2}$$

is prepared, which is obtained by multiplying the following polynomial F(X)

$$F(X) = \mu X^{n-1} + \mu X^{n-2} + \ldots \mu X + \mu$$

where $\mu = \frac{1}{8}$,
that forms the above-described finite cyclic group and serves as a test vector, by $X^{n/2}$.

It is assumed that there is a TLWE ciphertext c obtained by encrypting the plaintext $\mu 1$ with the private key [s].

Each element of this TLWE ciphertext $c = ([a], b)$ is multiplied by 2n and is then rounded off, whereby a LWE ciphertext $c' = ([a'], b')$ is obtained.

When the LWE ciphertext $c' = ([a'], b')$ is decrypted, $\mu 1 = \varphi_s(c') \approx 2N \times \varphi_s(c) = 2N\mu 1$ is obtained. As N becomes larger, an error becomes smaller relatively.

A trivial TRLWE ciphertext (0, T(X)) whose plaintext is the polynomial T(X) is prepared, and it is assumed that $A_0 = X^{-b'} \times (0, T(X)) = (0, X^{-b'} \times T(X))$, where 0 indicates a 0th degree polynomial 0. Since b' is an integer, a power of X can be defined naturally.

Subsequently, $A_i = CMux(BK_i, A_{i-1}, X^{a'_i} A_{i-1})$ is calculated in turn by using $BK_i$ that is the above-described Bootstrapping Key. Since a'i is an integer also in this expression, a power of X can be defined naturally.

Accordingly, the plaintext is not changed as it is when $s_i$ is 0, and multiplication by $X^{a'_i}$ is performed in turn when $s_i$ is 1.

Therefore, when calculation is repeated as represented by $$\phi_s'(A_0) = X^{-b'} T(X)$$

$$\phi_s'(A_1) = X^{s_1 a_1' - b'} T(X)$$

$$\phi_s'(A_2) = X^{s_2 a_2' + s_1 a_1' - b'} T(X)$$

then $$\phi_s'(A_n) = X^{\sum_{i=1}^N s_i \times a_i' - b'} T(X)$$

is obtained.

Here, $$\sum_{i=1}^N s_i \times a_i' - b'$$

is equal to the decryption function $\varphi s(c')$ with a sign reversed. Therefore, $$\phi_s'(A_2) = X^{-\phi_s(c')} T(X)$$

is obtained. Here, $\varphi x'(A_n)$ is a ciphertext of a polynomial obtained by multiplying $\mu 1'$ times the polynomial T(X) by $X^{-1}$.

(2) SampleExtract

In the plaintext polynomial $\varphi_s(A_n)$ obtained by decrypting the TRLWE ciphertext An obtained by BlindRotate in (1), $n/2 - \varphi_s(c')$ terms from the lowest term have a coefficient of $-\mu$. When $\varphi_s(A_n)$ is negative, coefficients are $-\mu$ from the highest term in turn conversely.

When attention is paid only to a constant term of the plaintext polynomial $\varphi_s(A_n)$ obtained by decrypting the TRLWE ciphertext $A_n$, the constant term is $\mu$ if $\varphi_s(c')$ is equal to or greater than n/2 and less than 3n/2, that is, $\varphi_s(c)$ is $\frac{1}{2}\pm\frac{1}{4}$. Otherwise, i.e., if $\varphi_s(c)$ is $\pm\frac{1}{4}$, the constant term is $-\mu$.

SampleExtract is a process for extracting only the coefficient of the constant term of the plaintext polynomial $\varphi_s(A_n)$ from the TRLWE ciphertext $A_n$ obtained by BlindRotate in (1) without decrypting the TRLWE ciphertext $A_n$, thereby obtaining a TLWE ciphertext cs.

The process for obtaining the TLWE ciphertext cs is described.

All TRLWE ciphertexts can be expressed as $(A(X), B(X))$ by putting polynomials $$A(X)=\Sigma_{i=1}^{n}a_i X^{i-1}$$

$$B(X)=\Sigma_{i=1}^{n}b_i X^{i-1}$$

where n is the degree.

When decryption with the private key [s'] is performed, the expression can be expanded by putting a polynomial of the private key as $$S'(X)=\Sigma_{j=1}^{n}s_j' X^{j-1}.$$

Then, $$\phi_s'(c)=B(X)-S'(X)\cdot A(X)=\Sigma_{i=1}^{n}b_i X^{i-1}-\Sigma_{i=1}^{n}\Sigma_{j=1}^{n}a_i s_j' X^{(i+j-2)}$$

is obtained.

The following operation is then performed with regard to this expression.

$$\sum_{i=1}^{n} b_i X^{i-1} - \sum_{i=1}^{n}\sum_{j=1}^{n} a_i s_j' X^{(i+j-2)} =$$

$$\sum_{j=1}^{n} b_j X^{j-1} - \sum_{i=1}^{n}\sum_{j=i-1}^{n+i-2} a_i s_{j-i+2}' ,$$

$$X^j = \sum_{i=1}^{n} b_i X^{i-1} - \sum_{i=1}^{n}\sum_{j=i-1}^{n-1} a_i s_{j-i+2}' X^j - \sum_{i=1}^{n}\sum_{j=n}^{n+i-2} a_i s_{j-i+2}' X^j =$$

$$\sum_{j=1}^{n} b_j X^{j-1} - \sum_{j=0}^{n-1}\sum_{i=1}^{j+1} a_i s_{j-i+2}' X^j - \sum_{j=n}^{2n-2}\sum_{i=j-n+2}^{n} a_i s_{j-i+2}' X^j =$$

$$\sum_{j=0}^{n-1} b_{j+1} X^j - \sum_{j=0}^{n-1}\sum_{i=0}^{j} a_{i+1} s_{j-i+1}' X^j -$$

$$\sum_{j=0}^{n-2}\sum_{i=j-n+1}^{-1} a_{i+n+1} s_{j-i+1}' X^{j+n} =$$

$$\sum_{j=0}^{n-2} b_{j+1} X^j + b_n X^{n-1} - \sum_{j=0}^{n-2}\sum_{i=0}^{j} a_{i+1} s_{j-i+1}' X^j -$$

$$\sum_{i=0}^{n-1} a_{i+1} s_{n-i}' X^{n-1} - \sum_{j=0}^{n-2}\sum_{i=j-n+1}^{-1} a_{i+n+1} s_{j-i+1}' X^{j+n} =$$

$$\sum_{j=0}^{n-2}\left(b_{j+1} X^j - \sum_{i=0}^{j} a_{i+1} s_{j-i+1}' X^j - \sum_{i=j-n+1}^{-1} a_{i+n+1} s_{j-i+1}' X^{j+n}\right) +$$

$$b_N X^{n-1} - \sum_{i=0}^{n-1} a_{i+1} s_{n-i}' X^{n-1}$$

Since this is "factor ring of polynomial ring", a remainder when this is divided by $(X^n+1)$ is calculated. Then, $$\Sigma_{j=0}^{n-2}(b_{j+1}X^j - \Sigma_{i=0}^{j}\alpha'_{i+1}s'_{j-i+1}X^j + \Sigma_{i=j-n+1}^{-1}\alpha'_{i+n+1}s'_{j-i+1}X^j) + b_N X^{n-1} - \Sigma_{i=0}^{n-1}\alpha'_{i+1}s'_{n-i}X^{n-1} = \Sigma_{j=0}^{n-2}(b_{j+1} - \Sigma_{i=0}^{j}\alpha'_{i+1}s'_{j-i+1} + \Sigma_{i=j-n+1}^{-1}\alpha'_{i+n+1}s'_{j-i+1})X^j + (b_n - \Sigma_{i=0}^{n-1}\alpha'_{i+1}s'_{n-i})X^{n-1}$$

is obtained.
Further, when $$a_i' = \begin{cases} a_i & (i \geq 1) \\ -a_{i+n} & (\text{otherwise}) \end{cases}$$

is put, then $$=\Sigma_{j=0}^{n-2}(b_{j+1}-\Sigma_{i=0}^{j}\alpha'_{i+1}s'_{j-i+1}-\Sigma_{i=j-n+1}^{-1}\alpha'_{i+1}s'_{j-i+1})X^j + (b_N-\Sigma_{i=0}^{n-1}\alpha'_{i+1}s'_{n-i})X^{n-1}$$

$$=\Sigma_{j=0}^{n-2}(b_{j+1}-\Sigma_{i=j-n+1}^{j}\alpha'_{i+1}s'_{j-i+1})X^j + (b_N-\Sigma_{i=0}^{n-1}\alpha_{i+1}s'_{n-i})X^{n-1}$$

$$=\Sigma_{j=0}^{n-2}(b_{j+1}-\Sigma_{i=0}^{n-1}\alpha'_{i+j-n+2}s'_{n-i})X^j + (b_n-\Sigma_{i=0}^{n-1}\alpha_{i+1}s'_{n-i})X^{n-1}$$

$$=\Sigma_{j=0}^{n-1}(b_{j+1}-\Sigma_{i=0}^{n-1}\alpha'_{i+j-n+2}s'_{n-i})X^j$$

is obtained, and coefficients of respective terms in a plaintext polynomial are obtained from $$\phi_s'(c)=\Sigma_{j=0}^{n-1}(b_{j+1}-\Sigma_{i=0}^{n-1}\alpha'_{i+j-n+2}s'_{n-i})X^j.$$

Among the obtained coefficients, a coefficient of a constant term is necessary. Therefore, when a coefficient for j=0 is extracted, $$b_1-\Sigma_{i=0}^{n-1}\alpha'_{i-n+2}s'_{n-i}$$

is obtained. When $$\alpha''_i = \alpha'_{-i+2}$$

is put, the extracted coefficient can be transformed to a decryption function of TLWE encryption as represented by $$b_1-\Sigma_{i=0}^{n-1}a''_{n-i}s'_{n-i}=b_1-\Sigma_{i=0}^{n-1}\alpha''_i s'_i=b_1-\vec{s'}\cdot\vec{\alpha''}=\phi_s'(\vec{\alpha''},b_1)$$

That is, when coefficients are extracted from the TRLWE ciphertext $A_n=(A(X), B(X))$ obtained by BlindRotate in (1), as $$a_i'' = \begin{cases} a_1 & (i = 1) \\ -a_{i+n+2} & (\text{otherwise}) \end{cases},$$

a new TLWE ciphertext ([a"], $b_1$) whose plaintext is the same value as the constant term of the plaintext polynomial corresponding to the original TRLWE ciphertext $A_n$ is obtained. This new TLWE ciphertext has either of two types, i.e., $-\mu$ or $\mu$ as a plaintext.

A TLWE ciphertext cs=([a"], b1)+([0], $\mu$) obtained by adding a trivial ciphertext ([0], $\mu$) whose plaintext is $\mu$ to the thus obtained TLWE ciphertext is the output of SampleExtract.

Specifically, since $\mu$ is $\frac{1}{8}$ in the polynomial F(X) as a test vector, a ciphertext of $-\frac{1}{8}$ or $\frac{1}{8}$ is obtained in this stage.

When a trivial TLWE ciphertext ([0], $\frac{1}{8}$) whose plaintext is $\mu=\frac{1}{8}$ is added to this ciphertext, the new TLWE ciphertext cs having either of two values, i.e., 0 or $\frac{1}{4}$ as a plaintext is obtained from $-\frac{1}{8}+\frac{1}{8}=0$ $\frac{1}{8}+\frac{1}{8}=\frac{1}{4}.$ In TFHE, the operation described above is referred to as SampleExtract.

(3) KeySwitching

The TLWE ciphertext cs obtained by SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of KeySwitching is described.

The private key [s] of a TLWE ciphertext used in a NAND operation is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s'_i \times 2^{-1} s'_i \times 2^{-2} s'_i \times 2^{-3}.$$

The private key is [s]. A "number of digits" t is a system parameter.

When decryption is performed with the private key [s], $$\varphi_s(KS_{i,j}) = s'_i \times 2^{-j}$$

is obtained. This is a "KeySwitching key".

As described above, the TLWE ciphertext cs=([a], b) obtained in (2) is 0 or ¼ obtained by encryption with the private key [s']. The number of elements of [a] is the same as that of the private key [s'] and is n.

When the elements are converted to t-bit fixed-point numbers one by one, the elements can be written in the following form.

$$\alpha_i \approx \Sigma_{j=1}^t \alpha_{i,j} \times 2^{-j}$$

Although an error is increased in this stage, the maximum value of the absolute value can be limited by a system parameter.

As main processing of KeySwitching, the following TLWE ciphertext cx is calculated.

$$cx = (\vec{0}, b) - \Sigma_{i=1}^n \Sigma_{j=1}^t \alpha_{i,j} \times KS_{i,j}$$

Since the term ([0], b) is a trivial ciphertext, this term is b when being decrypted. A result of decryption of the TLWE ciphertext cx is calculated as follows.

$$\varphi_s(cx) = b - \Sigma_{i=1}^n \Sigma_{j=1}^t \alpha_{i,j} \times s'_i \times 2^{-j} = b - \Sigma_{i=1}^n \Sigma_{j=1}^t s'_i \times \alpha_{i,j} \times 2^{-j}$$

Since $s'_i$ is a constant for j, it is factored out as follows.

$$= b - \Sigma_{i=1}^n s'_i \Sigma_{j=1}^t \alpha_{i,j} \times 2^{-j}$$

The expression obtained by decomposition into fixed-point numbers described above is then substituted.

$$\approx b - \Sigma_{i=1}^n s'_i \times \alpha_i = \varphi_{s'}((\vec{\alpha}, b)) = \varphi_{s'}(c_s)$$

As a result, $$\varphi_s(cx) \approx \varphi_{s'}(c_s)$$

is obtained. That is, switching of keys is successful.

The TLWE ciphertext cx obtained here is encrypted with the private key [s] that is the same as a private key for the TLWE ciphertext c used as the input of Gate Bootstrapping.

By performing the processing of KeySwitching, the ciphertext returns to the TLWE ciphertext encrypted with the private key [s], so that its plaintext $\varphi_s(cx)$ is 0 when $\varphi_s(c)$ is in a range of ±¼, and is ¼ when $\varphi_s(c)$ is in a range of ½±¼.

By the processing described above, a TLWE ciphertext is obtained as a result of Gate Bootstrapping, which is either of two values, i.e., 0 or ¼ and has any error within ±1/16.

The maximum value of the error does not depend on the TLWE ciphertext c that is the input, and is a value fixed by a system parameter.

Therefore, the system parameter is set in such a manner that the maximum value of the error is any value within ±1/16 that is the same range as that for a TLWE ciphertext as the input.

This setting enables a NAND operation to be performed any number of times, and enables any operation including addition and multiplication to be performed.

Examples of an error added to a "plaintext" of a TLWE ciphertext output from Gate Bootstrapping include an error added by converting a TLWE ciphertext to an integer, an error added by CMux, and an error when the TLWE ciphertext is converted to a fixed-point number by KeySwitching. All these errors can be limited by a system parameter, and the system parameter can be adjusted in such a manner that an error for which all things are considered falls within ±1/16.

The processing described above is processing of Gate Bootstrapping in TFHE.

In the present embodiment, binary Gate Bootstrapping in TFHE described above is improved, and ternary Gate Bootstrapping is used for an operation by a full adder, whereby the number of times of Gate Bootstrapping is reduced.

Specifically, the encryption processing device 1 reduces the number of logical operations (homomorphic operations) itself by making improvement, in particular, in a full adder used for an operation of fully homomorphic encryption, in such a manner that Gate Bootstrapping performed for each homomorphic operation can output a ciphertext that can be multiple values (for example, three values) as a plaintext.

As a result, the encryption processing device 1 can reduce the number of times of Gate Bootstrapping that is performed in the latter stage of a logical operation (a homomorphic operation) and that requires a long operation time, and can largely reduce a processing time of fully homomorphic encryption.

The number of logical operations (homomorphic operations) is reduced, and a processing time of fully homomorphic encryption is largely reduced.

Ternary Gate Bootstrapping in the present embodiment is described in detail with reference to FIGS. 2 and 3.

There is considered a case in which TLWE ciphertexts ca, cb, and cc respectively corresponding to plaintexts A, B, and C are input to the configuration of the full adder illustrated in FIG. 3.

As described above, the TLWE ciphertexts ca, cb, and cc are encrypted by additive homomorphic encryption, and a sum of the plaintexts can be calculated by calculating a sum of the ciphertexts.

These TLWE ciphertexts ca, cb, and cc are created by binary Gate Bootstrapping described above or are newly encrypted.

It is assumed that the plaintexts A, B, and C of the TLWE ciphertexts ca, cb, and cc are either 0 or ¼ on the circle group {T} in FIG. 4, for example, and an error is included in ±1/16.

First, the first operation unit 12 performs an operation ca+cb+([0], ⅛). As described above, ([0], ⅛) is a trivial TLWE ciphertext from which the same plaintext ⅛ is obtained by a decryption function with any private key.

The operation result is either of three values including ⅛, ⅜, and ⅝ from $$0+0+⅛=⅛$$

$$0+¼+⅛=⅜$$

$$¼+¼+⅛=⅝$$

and a ciphertext of any of these three plaintexts is obtained.

An error added to the plaintext is within ±⅛. This is because two errors, i.e., an error of ca and an error of cb each of which is ±¹⁄₁₆ are added together.

The first Bootstrapping unit 14 performs ternary Gate Bootstrapping for the result of the operation by the first operation unit 12.

Figure 6:
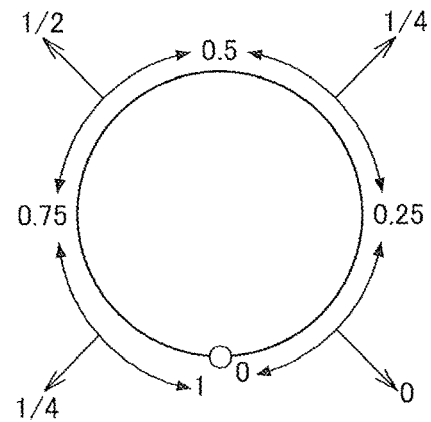
FIG. 6 is an operation image diagram of ternary Gate Bootstrapping.

FIG. 6 is an operation image diagram of ternary Gate Bootstrapping.

As illustrated in FIG. 6, ternary Gate Bootstrapping can obtain a TLWE ciphertext (a temporary ciphertext ct described later) (mapped over the circle group {T}) that can have three values as a plaintext based on the circle group {T} in FIG. 4.

The above ⅛±⅛ is from 0 to 0.25 (¼). From this range on the circle group {T}, a TLWE ciphertext whose plaintext is "0" is obtained.

Further, ⅜±⅛ is from 0.25 (¼) to 0.5 (½). From this range on the circle group {T}, a TLWE ciphertext whose plaintext is "¼" is obtained.

Furthermore, ⅝±⅛ is from 0.5 (½) to 0.75 (¾). From this range on the circle group {T}, a TLWE ciphertext whose plaintext is "½" is obtained.

In the present embodiment, a plaintext of a non-0 ciphertext is set to ¼, an error of each of the TLWE ciphertext ca and the TLWE ciphertext cb is set to ±¹⁄₁₆, and an error for a plaintext in ca+cb is set to ±⅛ so as to allow the TLWE ciphertext ct based on ca+cb to be able to have three values on the circle group {T} as a plaintext as a result of ternary Gate Bootstrapping.

In ternary Bootstrapping, addition between ciphertexts prior to Bootstrapping, BlindRotate, SampleExtract, and KeySwitching are performed in a manner identical to that in binary Gate Bootstrapping.

Addition or subtraction of a trivial ciphertext corresponding to an appropriate plaintext in a stage of addition between ciphertexts, multiplying a test vector by X to any power prior to BlindRotate, and changing the position of a sample extracted in SampleExtract are nontrivially essentially the same process.

That is, the same result is obtained from addition of a trivial ciphertext ([0], ⅛) to the result of the operation ca+cb, multiplying the test vector by $X^{-n/4}$, and extracting a value at the n/2 position and reversing the sign of the extracted value in SampleExtract.

The encryption processing device 1 performs BlindRotate as the first step of ternary Gate Bootstrapping.

In the aforementioned paper, $$F(X) = \mu X^{n-1} + \mu X^{n-2} + \ldots + \mu X + \mu$$

where μ=⅛ is used as a test vector in BlindRotate. Meanwhile, the encryption processing device 1 uses $$T1(X) = \mu_1 X^{n-1} + \mu_1 X^{n-2} + \ldots \mu_1 X^{(n/2)} + \mu_2 X^{(n/2)-1} + \ldots \mu_2 X + \mu_2$$

where $\mu_1 = ½$ and $\mu_2 = ¼$ as a test vector in BlindRotate of ternary Gate Bootstrapping.

This test vector polynomial T1(X) has coefficients that are different in a higher-degree part and a lower-degree part.

In the higher-degree part, the coefficient $\mu_1$ is set to ½. In the lower-degree part, the coefficient $\mu_2$ is set to ¼.

The coefficients μ1 and $\mu_2$ of the test vector polynomial T1(X) are possible values of a plaintext of a TLWE ciphertext output by ternary Gate Bootstrapping of the present embodiment, the possible values being on the circle group {T}.

The encryption processing device 1 performs BlindRotate using the test vector polynomial T1(X) in a manner identical to that in the aforementioned paper, to obtain a TRLWE ciphertext.

In BlindRotate, in a range from 0 to 0.25 on the circle group {T}, when a TLWE ciphertext (ca+cb)' is obtained by multiplying the TLWE ciphertext ca+cb by 2n, 0×2n=0 and 0.25×2n=n/2 are obtained.

As described with regard to a polynomial serving as a test vector, when the polynomial T1(X) is multiplied by X, the coefficient of the top term appears as a constant term with a sign reversed from positive to negative as represented by $\mu_1 X^{n-1} + \mu_1 X^{n-2} + \ldots \mu_1 X^{(n/2)} + \mu_2 X^{(n/2)-1} + \ldots \mu_2 X - \mu_2$.

When multiplication by X is further performed, the same phenomenon happens again as represented by $\mu_1 X^{n-1} + \mu_1 X^{n-2} + \ldots \mu_1 X^{(n/2)} + \mu_2 X^{(n/2)-1} + \ldots + \mu_2 X^2 - \mu_2 X - \mu_2$ (the coefficient of the top term appears as a constant term with a sign reversed from positive to negative).

When this multiplication is repeated n times, the coefficients of all terms become negative as represented by $-\mu_1 X^{(n-1)}$ to $-\mu_1 X^{(n-2)} - \mu_2 X^{(n/2-1)}$ to $-\mu_2$.

When multiplication by X is further continued, the coefficient of the top term appears as a constant term with a sign reversed from negative to positive as represented by $$-\mu_1 X^{(n-1)} \ldots -\mu_1 X^{(n/2)} -\mu_2 X^{(n/2-1)} \ldots -\mu_2 X + \mu_1$$

$$-\mu_1 X^{(n-1)} \ldots -\mu_1 X^{(n/2)} -\mu_2 X^{(n/2-1)} \ldots +\mu_2 X + \mu_1.$$

When multiplication by X is repeated 2n times in total, the multiplication result returns to the original polynomial $$T1(X) = \mu_1 X^{n-1} + \mu_1 X^{n-2} + \ldots + \mu_1 X^{(n/2)} + \mu_2 X^{(n/2)-1} + \ldots + \mu_2 X + \mu_2.$$

That is, one round (0→1) of the circle group {T} is converted into 0→2n, and 0→0.25 corresponds to a section of 0→n/2.

Therefore, in the corresponding SampleExtract, a constant term of a plaintext polynomial of a TRLWE ciphertext is the coefficient $\mu_2 = ¼$ of $\mu_2 X^{(n/2)-1} + \ldots \mu_2 X + \mu_2$ in the lower-order part of the above test vector.

In BlindRotate, in a range from 0.25 to 0.5 on the circle group {T}, when the ciphertext (ca+cb)' is obtained by multiplying the TLWE ciphertext ca+cb by 2n, a plaintext of (ca+cb)' enters between n/2 and n from 0.25×2n=n/2 and 0.5×2n=n.

Therefore, in the corresponding SampleExtract, the constant term of the plaintext polynomial of the TRLWE ciphertext is the coefficient $\mu_1 = ½$ of $\mu_1 X^{n-1} + \mu_1 X^{n-2} + \ldots \mu_1 X^{(n/2)}$ in the higher-order part of the above test vector.

Furthermore, in BlindRotate, in a range from 0.5 to 0.75 on the circle group {T}, when the TLWE ciphertext (ca+cb)' is obtained by multiplying the TLWE ciphertext ca+cb by 2n, the plaintext of (ca+cb)' enters between n and 3n/2 from 0.5×2n=n and 0.75×2n=3n/2.

The coefficients are rotated by multiplication of the test vector by X, and are negative in a range from 0.5 to 1 on the circle group {T}.

In the corresponding SampleExtract, the constant term of the plaintext polynomial of the TRLWE ciphertext is −¼ that is obtained by changing the sign of the coefficient $\mu_2 = ¼$ of $\mu_2 X^{(n/2)-1} + \ldots \mu_2 X + \mu_2$ in the lower-order part of the above test vector to negative. On the circle group {T}, −¼ is the same as ¾. Therefore, ¾ becomes a constant term of the TRLWE ciphertext d.

As described above, the encryption processing device 1 obtains the TRLWE ciphertext d that can have three values of ¼, ½, and ¾ as a constant term of a plaintext polynomial in BlindRotate, and performs SampleExtract for the TRLWE ciphertext d.

In SampleExtract in the aforementioned paper, a trivial TLWE ciphertext ([0], ⅛) whose plaintext is ⅛ is further added to a TLWE ciphertext obtained after SampleExtract.

Meanwhile, the encryption processing device 1 adds a trivial TLWE ciphertext ([0], −¼) whose plaintext is −¼ to a TLWE ciphertext that can have three values of ¼, ½, and ¾, obtained in the middle.

As a result of that operation, a TLWE ciphertext that has any of three values including 0, ¼, and ½ as a plaintext is obtained from

¼+(−¼)=0

½+(−¼)=¼

¾+(−¼)=½, as illustrated in FIG. 6.

The encryption processing device 1 performs KeySwitching identical to that in the aforementioned paper, for the thus obtained TLWE ciphertext.

As a result, the encryption processing device 1 obtains, as output of ternary Gate Bootstrapping, the temporary (temporarily used) TLWE ciphertext ct that can have three values of 0, ¼, and ½ as a plaintext and in which an error added to the plaintext is included in a range of ±¹⁄₁₆.

In the result of the operation of the TLWE ciphertexts ca+cb performed before ternary Gate Bootstrapping, an error of ±⅛ has been added to a sum (a+b) of plaintexts.

It is thus found that as a result of ternary Gate Bootstrapping, the error added to the plaintext in the new TLWE ciphertext ct is reduced to ±¹⁄₁₆, i.e., to an error in the same range as the error of the original TLWE ciphertexts ca and cb.

Since the error is reduced, the TLWE ciphertext ct can be used for a logical operation again.

As processing by a full adder, the encryption processing device 1 adds the TLWE ciphertext cc of a carry input to the TLWE ciphertext ct obtained as a result of ternary Gate Bootstrapping.

The second operation unit 13 performs an operation ct+cc+([0], −⅛), and the third operation unit 14 performs an operation 2× (ct+cc).

The second calculation unit 16 and the third calculation unit 17 perform binary Gate Bootstrapping described in the aforementioned paper for the output of the second operation unit 13 and the output of the third operation unit 14 (both are TLWE ciphertexts that can have two values), respectively, whereby TLWE ciphertexts cy and cz as the carry output $C_o$ and the output S of the full adder are further obtained.

Because of the configuration described above, according to the present embodiment, the number of times of Gate Bootstrapping that consumes almost all operation time in an operation by a logical operation element can be reduced to three.

In a case of implementing a full adder only by binary Gate Bootstrapping in the aforementioned paper without performing ternary Gate Bootstrapping, it is necessary to perform binary Gate Bootstrapping five times. As compared with that case, it has been confirmed by experiment that the method of the present embodiment can reduce the operation time by 40%.

Further, binary Gate Bootstrapping that processes a carry output and binary Gate Bootstrapping that processes a SUM output, both performed in the latter stage, do not depend on each other. Therefore, by performing the processes in parallel by multithread processing or the like, the processing time of the entire full adder can be made equal to the processing time for two times of Gate Bootstrapping.

By performing the two processes of binary Gate Bootstrapping performed in the latter stage in parallel, the operation time can be expected to be further reduced by 33% as compared with a case of performing Gate Bootstrapping three times without making those two processes parallel.

Also in a case where the method illustrated in FIG. 1 is multithreaded, the processing time of the entire full adder can be made equal to the processing time for three times of Gate Bootstrapping. Even as compared with that case, it can be expected that the multithreaded method of the present embodiment can reduce the operation time by 33%.

Figure 7:
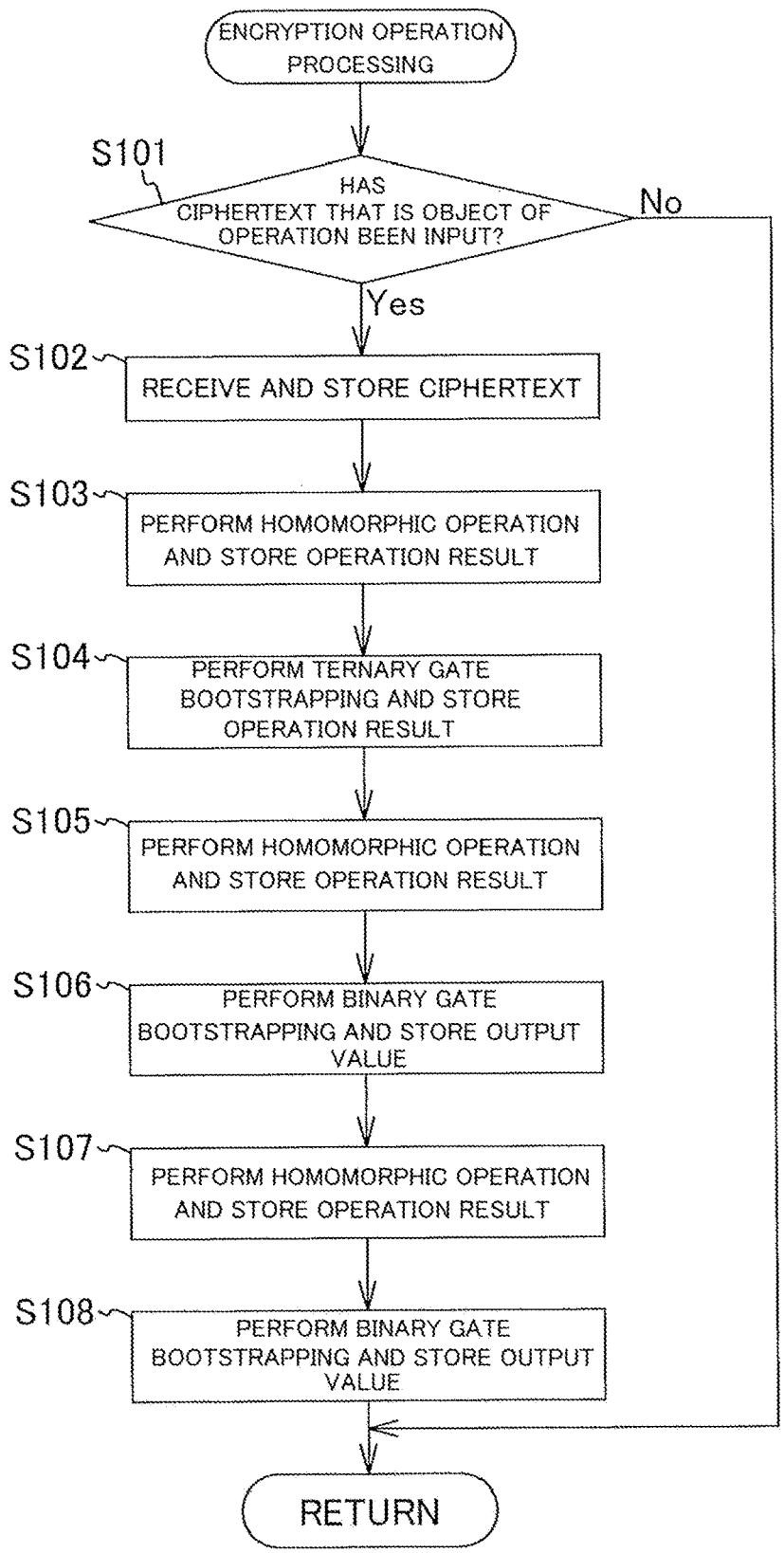
FIG. 7 is a flowchart for explaining a processing flow of an operation by a full adder performed by an encryption processing device.

FIG. 7 is a flowchart for explaining a processing flow of an operation by a full adder performed by an encryption processing device.

As described above, in a case of a binary ciphertext, a plaintext in a section from 0 to ¼ or from ¾ to 1 on the circle group {T} is converted to a TLWE ciphertext 0. Further, a plaintext in a section from ¼ to ¾ on the circle group {T} is converted to a TLWE ciphertext ¼. An error added to the plaintext in this conversion is any value within a range of ±¹⁄₁₆.

Symbols used in a (multi-value) logical operation, for example, 0 and 1 are associated with the aforementioned ranges on the circle group {T}.

That is,

| Symbol | Range on circle group {T} |
| --- | --- |
| 0 | 0 ± ¹⁄₁₆ |
| 1 | ¼ ± ¹⁄₁₆ | is obtained.

In a case of a ternary ciphertext, a plaintext in a section from 0 to ¼ on the circle group {T} is converted to a TLWE ciphertext 0. A plaintext in a section from ¼ to ½ or from ¾ to 1 on the circle group {T} is converted to a TLWE ciphertext ¼. A plaintext in a section from ½ to ¾ on the circle group {T} is converted to a TLWE ciphertext ½. An error added to the plaintext in this conversion is any value within a range of ±¹⁄₁₆.

Symbols 0, 1, and 2 used in a (multi-value) logical operation are associated with the aforementioned ranges on the circle group {T}.

| Symbol | Range on circle group {T} |
| --- | --- |
| 0 | 0 ± ¹⁄₁₆ |
| 1 | ¼ ± ¹⁄₁₆ |
| 2 | ½ ± ¹⁄₁₆ |

The range (including the error) on the circle group {T} is associated with a value of any of a binary or ternary plaintext in a ciphertext.

A ciphertext is a vector in the form of ([a], b), and a vector element is a point on a circle group {T}. A plaintext is also a point on a circle group {T}.

Symbols 0, 1, and 2 used in a multi-value logical operation are associated with the ranges on the circle group {T}, and a plaintext for a certain ciphertext indicates a point within the range. It is difficult to identify which point in the range is indicated by the plaintext without a private key. The strength of TLWE ciphertexts is thus ensured. When the range is assumed as and points on the circle group and symbols are associated with each other, a plaintext can be derived as a simultaneous equation by collecting a plurality of ciphertexts, so that the strength of TLWE ciphertexts are lowered.

At Step S101, the encryption processing device 1 (the receiving unit 11) determines whether a ciphertext that is an object of an operation has been input.

When it is determined that the ciphertext has been input (Yes at Step S101), the encryption processing device 1 (the receiving unit 11) receives the ciphertext and stores it in the storage unit 20 at Step S102.

Next, at Step S103, the encryption processing device 1 (the first operation unit 12) performs a homomorphic operation using the ciphertext and stores an operation result in the storage unit 20.

At Step S104, the encryption processing device 1 (the first calculation unit 15) performs ternary Gate Bootstrapping for the operation result to calculate a temporary ciphertext that has multiple values (three values) as a plaintext, and stores it in the storage unit 20.

As a result of processing by the first operation unit 12 and the first calculation unit 15, an operation described in the following truth table is performed.

This operation is to receive input of two ciphertext ca and cb each having two values as a plaintext and to obtain output of the temporary ciphertext ct having three values as a plaintext from the ciphertext ca+the ciphertext cb.

| ciphertext ca | ciphertext cb | ciphertext ca + ciphertext cb = temporary ciphertext ct |
|---|---|---|
| 1 | 1 | 2 |
| 1 | 0 | 1 |
| 0 | 1 | 1 |
| 0 | 0 | 0 |

For example, when each of the two input ciphertexts is symbol 0 or 1, that is, is in a section $0\pm\frac{1}{16}$ or $\frac{1}{4}\pm\frac{1}{16}$, and the operation at Step S103 is performed, the following operation is performed.

When ca is 0 and cb is 0: $0\pm\frac{1}{16}+0\pm\frac{1}{16}+\frac{1}{8}=\frac{1}{8}\pm\frac{1}{8}$
When ca is 0 and cb is 1: $0\pm\frac{1}{16}+\frac{1}{4}\pm\frac{1}{16}+\frac{1}{8}=\frac{3}{8}\pm\frac{1}{8}$
When ca is 1 and cb is 0: $\frac{1}{4}\pm\frac{1}{16}+0\pm\frac{1}{16}+\frac{1}{8}=\frac{3}{8}\pm\frac{1}{8}$
When ca is 1 and cb is 1: $\frac{1}{4}\pm\frac{1}{16}+\frac{1}{4}\pm\frac{1}{16}+\frac{1}{8}=\frac{5}{8}\pm\frac{1}{8}$ Further, when ternary Gate Bootstrapping (FIG. 6) is performed, the output of the temporary ciphertext ct is as follows.

When ca is 0 and cb is 0: $\frac{1}{8}\pm\frac{1}{8}\rightarrow 0\pm\frac{1}{16}=0$
When ca is 0 and cb is 1: $\frac{3}{8}\pm\frac{1}{8}\rightarrow\frac{1}{4}\pm\frac{1}{16}\gg 1$
When ca is 1 and cb is 0: $\frac{3}{8}\pm\frac{1}{8}\rightarrow\frac{1}{4}\pm\frac{1}{16}\gg 1$
When ca is 1 and cb is 1: $\frac{5}{8}\pm\frac{1}{8}\rightarrow\frac{1}{2}\pm\frac{1}{16}\gg 2$ At Step S105, the encryption processing device 1 (the second operation unit 13) performs a homomorphic operation of the temporary ciphertext ct and a carry input cc and stores an operation result in the storage unit 20.

At Step S106, the encryption processing device 1 (the second calculation unit 16) performs binary Gate Bootstrapping for the result of the operation at Step S105 to calculate a carry output cy and stores it in the storage unit 20.

As a result of processing by the second operation unit 13 and the second calculation unit 16, an operation described in the following truth table is performed.

This operation is to receive input of the ciphertext ct having three values as a plaintext and input of the ciphertext cc having two values as a plaintext and to obtain the output ciphertext cy having two values as a plaintext from the ciphertext ct and the ciphertext cc.

| Temporary ciphertext ct | Ciphertext cc | Temporary ciphertext ct + ciphertext cc = ciphertext cy |
|---|---|---|
| 2 | 1 | 1 |
| 1 | 1 | 1 |
| 0 | 1 | 0 |
| 2 | 0 | 1 |
| 1 | 0 | 0 |
| 0 | 0 | 0 |

For example, when the ciphertext cc is symbol 0 or 1, that is, is in a section $0\pm\frac{1}{16}$ or $\frac{1}{4}\pm\frac{1}{16}$, and the ciphertext ct is symbol 0, 1, or 2, that is, is in a section $0\pm\frac{1}{16}$, $\frac{1}{4}\pm\frac{1}{16}$, or $\frac{1}{2}\pm\frac{1}{16}$, the following operation is performed as a homomorphic operation.

When ct is 0 and cc is 0: $0\pm\frac{1}{16}+0\pm\frac{1}{16}-\frac{1}{8}=-\frac{1}{8}\pm\frac{1}{8}$
When ct is 0 and cc is 1: $0\pm\frac{1}{16}+\frac{1}{4}\pm\frac{1}{16}-\frac{1}{8}=\frac{1}{8}\pm\frac{1}{8}$
When ct is 1 and cc is 0: $\frac{1}{4}\pm\frac{1}{16}+0\pm\frac{1}{16}-\frac{1}{8}=\frac{1}{8}\pm\frac{1}{8}$
When ct is 1 and cc is 1: $\frac{1}{4}\pm\frac{1}{16}+\frac{1}{4}\pm\frac{1}{16}-\frac{1}{8}=\frac{3}{8}\pm\frac{1}{8}$
When ct is 2 and cc is 0: $\frac{1}{2}\pm\frac{1}{16}+0\pm\frac{1}{16}-\frac{1}{8}=\frac{3}{8}\pm\frac{1}{8}$
When ct is 2 and cc is 1: $\frac{1}{2}\pm\frac{1}{16}+\frac{1}{4}\pm\frac{1}{16}-\frac{1}{8}=\frac{5}{8}\pm\frac{1}{8}$ Further, when binary Gate Bootstrapping (FIG. 5) is performed, the output of the output ciphertext cy is as follows.

When ct is 0 and cc is 0: $-\frac{1}{8}\pm\frac{1}{8}\gg 0$
When ct is 0 and cc is 1: $\frac{1}{8}\pm\frac{1}{8}\gg 0$
When ct is 1 and cc is 0: $\frac{1}{8}\pm\frac{1}{8}\gg 0$
When ct is 1 and cc is 1: $\frac{3}{8}\pm\frac{1}{8}141\ 1$
When ct is 2 and cc is 0: $\frac{3}{8}\pm\frac{1}{8}\gg 1$
When ct is 2 and cc is 1: $\frac{5}{8}\pm\frac{1}{8}\gg 1$ At Step S107, the encryption processing device 1 (the third operation unit 14) performs a homomorphic operation using the temporary ciphertext, the carry input, and a ciphertext.

At Step S108, the encryption processing device 1 (the third calculation unit 17) performs binary Gate Bootstrapping for the result of the operation at Step S105 to calculate the output ciphertext cz and stores it in the storage unit 20.

As a result of processing by the third operation unit 14 and the third calculation unit 17, an operation described in the following truth table is performed in plaintexts.

This operation is to receive input of the ciphertext ct having three values and input of the ciphertext cc having two values and to obtain output of the ciphertext cz having two values.

| Temporary ciphertext ct | Ciphertext cc | 2 (temporary ciphertext ct + ciphertext cc) = output ciphertext cz |
|---|---|---|
| 2 | 1 | 1 |
| 1 | 1 | 0 |
| 0 | 1 | 1 |
| 2 | 0 | 0 |
| 1 | 0 | 1 |
| 0 | 0 | 0 |

For example, when the ciphertext cc is symbol 0 or 1, that is, is in a section $0\pm\frac{1}{16}$ or $\frac{1}{4}\pm\frac{1}{16}$, and the ciphertext ct is symbol 0, 1, or 2, that is, is in a section $0\pm\frac{1}{16}$, $\frac{1}{4}\pm\frac{1}{16}$, or $\frac{1}{2}\pm\frac{1}{16}$, the following operation is performed as an homomorphic operation.

When ct is 0 and cc is 0: $2\times(0\pm\frac{1}{16}+0\pm\frac{1}{16})=0\pm\frac{1}{4}$ When ct is 0 and cc is 1: $2\times(0\pm\frac{1}{16}+\frac{1}{4}\pm\frac{1}{16})=\frac{1}{2}\pm\frac{1}{4}$
When ct is 1 and cc is 0: $2\times(\frac{1}{4}\pm\frac{1}{16}+0\pm\frac{1}{16})=\frac{1}{2}\pm\frac{1}{4}$
When ct is 1 and cc is 1: $2\times(\frac{1}{4}\pm\frac{1}{16}+\frac{1}{4}\pm\frac{1}{16})=0\pm\frac{1}{4}$
When ct is 2 and cc is 0: $2\times(\frac{1}{2}\pm\frac{1}{16}+0\pm\frac{1}{16})=0\pm\frac{1}{4}$
When ct is 2 and cc is 1: $2\times(\frac{1}{2}\pm\frac{1}{16}+\frac{1}{4}\pm\frac{1}{16})=\frac{1}{2}\pm\frac{1}{4}$ Further, when binary Gate Bootstrapping (FIG. 5) is performed, the output of the output ciphertext cz is as follows.

When ct is 0 and cc is 0: $0\pm\frac{1}{4} » 0$
When ct is 0 and cc is 1: $\frac{1}{2}\pm\frac{1}{4} » 1$
When ct is 1 and cc is 0: $\frac{1}{2}\pm\frac{1}{4} » 1$
When ct is 1 and cc is 1: $0\pm\frac{1}{4} » 0$
When ct is 2 and cc is 0: $0\pm\frac{1}{4} » 0$
When ct is 2 and cc is 1: $\frac{1}{2}\pm\frac{1}{4} » 1$ Binary Gate Bootstrapping at Step S106 and binary Gate Bootstrapping at Step S108 can be performed in parallel by multithread processing.

In one example in which an operation for obtaining OR (homomorphic OR) is performed for two TLWE ciphertexts x1 and x2, HomOR(x1, x2)=Bootstrapping ((0, ⅛)+x1+x2) is performed.

An operation example for actually obtaining OR of symbol 0 and symbol 0 is described.

Since random numbers are used for a ciphertext and an error is added to a plaintext, Decode(x1)=0+ 1/100 and Decode (x2)=0− 1/50 are obtained.

When an additive homomorphic operation is performed, Decode(x1+x2+(0, ⅛))=⅛− 1/100 is performed. At this time, an error component in the latter half becomes different every time encryption is performed.

When binary Gate Bootstrapping is performed, Decode (gate bootstrapping(x1+x2+(0, ⅛))=0+ 1/180 is performed.

A value in a range of $0\pm\frac{1}{16}$ is obtained by binary Gate Bootstrapping, which corresponds to a section from 0 to 0.125 or from 0.875 to 1. The error at this time depends on an original error and a system parameter.

Since 0±180 is within the range of symbol 0, i.e., the range of $0\pm\frac{1}{16}$, 0±180 becomes symbol 0.

Application Example

The speed increase of a full adder achieved by the encryption processing device 1 can be applied as follows.

For example, there is considered a case in which it is desired to aggregate, from a database in which fields and/or records are encrypted by TLWE encryption, records each having a specific field within a certain range (for example, a case in which it is desired to obtain an average annual income of 30 to 39 years old).

In this case, the encryption processing device 1 is a database sever that manages the encrypted database, receives a query encrypted by TLWE encryption from a terminal device connected thereto via a network or the like, and returns a response to the query which is encrypted by TLWE encryption to the terminal device.

Since an index cannot be created in the encrypted database, it is necessary to perform comparison and aggregation for the entire database.

The encryption processing device 1 performs a comparison operation that compares all the records of the encrypted database with the query by functions of the first operation unit 12, the second operation unit 13, the third operation unit 14, the first Bootstrapping unit 15, the second Bootstrapping unit 16, and the third Bootstrapping unit 17 that implement a full adder.

The comparison operation is to perform subtraction between a ciphertext of a record and a ciphertext of the query, and the sign of the subtraction result is equivalent to the comparison operation.

The encryption processing device 1 can further perform an aggregate operation for records that match the query in the comparison operation.

In the aggregate operation, the encryption processing device 1 adds the records that match the query in the comparison operation to calculate a total, and further obtains an average value by using division.

As described above, in processing of a query with respect to an encrypted database, it is necessary to perform four arithmetic operations such as addition, subtraction, multiplication, and division, and comparison (comparison is equivalent to positive or negative of a subtraction result) between integers constituting ciphertexts. In addition, it is considered that a full adder operation is frequently used for the processing. If the bit length of an integer to be handled becomes large, the number of required full adders also increases.

With speed increase of an operation by the full adder by ternary Gate Bootstrapping described above, a query execution time can be significantly reduced.

The four arithmetic operations are homomorphic four arithmetic operations with respect to encrypted numerical values that are regarded as ciphertexts of respective bits when a permutation using an input ciphertext is expressed in binary.

The four arithmetic operations and comparison between integers are used not only for aggregation in the database described above, but also in various data processing using ciphertexts frequently.

Other examples include fuzzy authentication and fuzzy search.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other.

Fuzzy search is an ambiguous search method in which data close to a query is presented as a search result from a database even if the query and a record do not completely match.

In fuzzy authentication and fuzzy search, the encrypted database and the query are compared with each other, as in the comparison operation and the aggregate operation in the encrypted database described above. At this time, it is necessary to perform the comparison operation using the data encrypted by homomorphic encryption.

In particular, in fuzzy authentication and fuzzy search, addition, subtraction, multiplication, division, and comparison between integers occupy most of the processing time, and therefore a significant effect can be obtained in shortening the processing time by speeding up an operation by a full adder used for these operations.

In addition, the Euclidean distance is often used for comparison in fuzzy authentication and fuzzy search. When the Euclidean distance is calculated, calculation of a square is required. Therefore, in Bit-wise type homomorphic encryption, $0(N^2)$ full adders must be caused to operate with respect to the bit length of data when multiplication is performed. Even in a comparison operation by simple subtraction, it is necessary to operate O (N) full adders. Therefore, by speeding up an operation by a full adder, the processing time required for fuzzy authentication or fuzzy search can be largely reduced.

Figure 8:
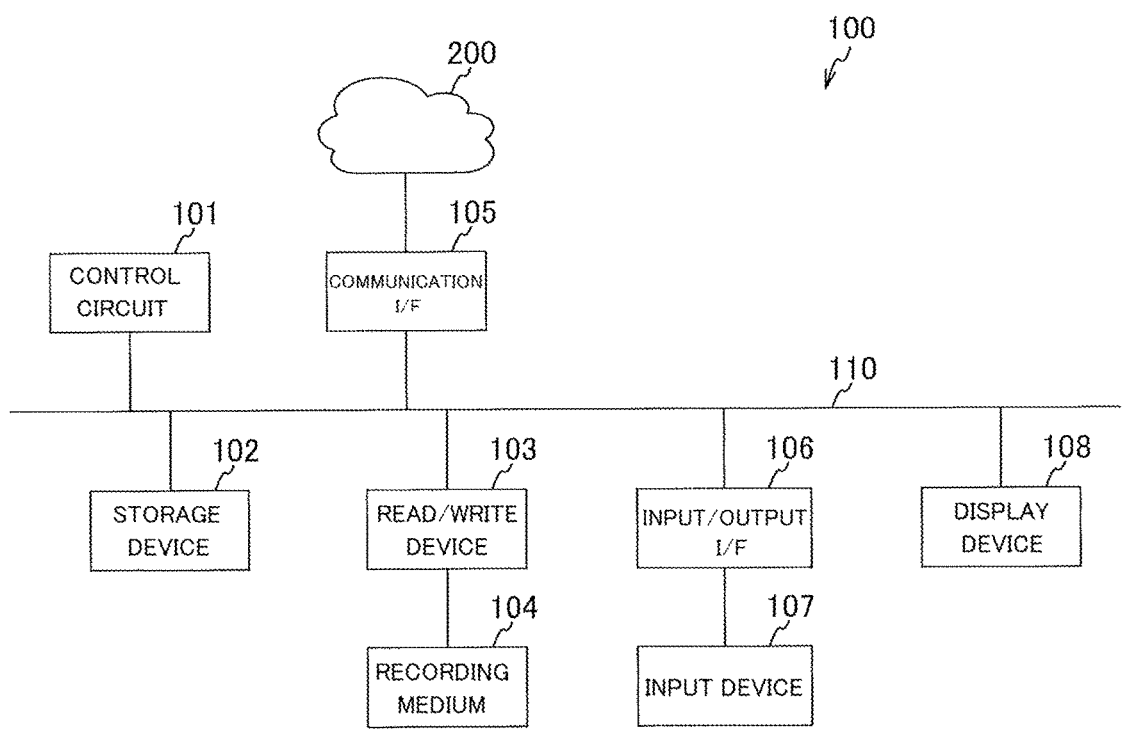
FIG. 8 is a block diagram illustrating an example of a computer device.

FIG. 8 is a block diagram illustrating an example of a computer device.

The configuration of a computer device 100 is described with reference to FIG. 8.

The computer device 100 is, for example, an encryption processing device that processes various types of information. The computer device 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing device 1 can be configured by a part or all elements which are selected from the constituent elements described in the computer device 100 as appropriate.

The control circuit 101 controls the entire computer device 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 2, for example.

The storage device 102 stores various types of data therein. For example, the storage device 102 is a memory such as a Read Only Memory (ROM) and a Random Access Memory (RAM), or a hard disk. The storage device 102 may store therein an information processing program that causes the control circuit 101 to function as the controller 10 in FIG. 2. The storage device 102 functions as the storage unit 20 in FIG. 2, for example.

The encryption processing device 1 loads a program stored in the storage device 102 into a RAM when performing information processing.

The encryption processing device 1 executes the program loaded to the RAM by the control circuit 101, thereby performing processing that includes at least one of a receiving process, a first operation process, a second operation process, a third operation process, a first Bootstrapping process, a second Bootstrapping process, a third Bootstrapping process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a non-volatile memory (non-temporal recording medium) such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer device 100 and another device to each other via the network 200 in a communicable manner. The communication interface 105 functions as the communication unit 25 in FIG. 2, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer device 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIG. 2, for example.

The display device 108 displays various types of information. The network 200 is, for example, a LAN, wireless communication, a P2P network, or the Internet and communicably connects the computer device 100 to other devices.

The present embodiment is not limited to the embodiment described above and various configurations or embodiments can be applied within a scope not departing from the gist of the present embodiment.

REFERENCE SIGNS LIST 1 encryption processing device, 10 controller, 11 receiving unit, 12 first operation unit, 13 second operation unit, 14 third operation unit, 15 first Bootstrapping unit (calculation unit), 16 second Bootstrapping unit (calculation unit), 17 third Bootstrapping unit (calculation unit), 18 output unit, 20 storage unit, 25 communication unit, 26 input unit, 100 computer device, 101 control circuit, 102 storage device, 103 read/write device, 104 recording medium, 105 communication interface, 106 input/output interface, 107 input device, 108 display device, 110 bus, 200 network

The invention claimed is:

1. An encryption processing device that processes a ciphertext, wherein
the ciphertext is a ciphertext of fully homomorphic encryption that allows a logical operation without decrypting the ciphertext, the logical operation including a homomorphic operation to the ciphertext, and a bootstrapping process to an operation result of the homomorphic operation, and
in a predetermined operation using the ciphertext, number of times of computation required for the predetermined operation is reduced by outputting an intermediate ciphertext having multiple values more than two values as a plaintext by using bootstrapping outputting the multiple values on a homomorphic operation result of the ciphertext having two values as plaintext, as the logical operation, wherein the predetermined operation is an operation of a full adder, wherein
the encryption processing device comprises a processor that executes a process comprising:
a first homomorphic operation of performing operation including a process to add a first ciphertext in which a value corresponding to one-digit binary number is encrypted and a second ciphertext in which a value corresponding to one-digit binary number is encrypted without decrypting the first and second ciphertext,
a first bootstrapping of performing a bootstrapping process to output a fourth ciphertext as the intermediate ciphertext corresponding to any one plaintext of three values by using a third ciphertext as input which is an operation result of the first homomorphic operation, a second homomorphic operation of performing operation including a process to add a fifth ciphertext in which value corresponding to one-digit binary number is encrypted and the fourth ciphertext without decrypting the fifth and fourth ciphertext, a second bootstrapping of performing a bootstrapping process to output a seventh ciphertext having a value as a plaintext corresponding to a carry of the full adder using as input a sixth ciphertext that is an operation result of the second homomorphic operation, a third homomorphic operation of performing a process to double a value obtained by adding the fifth ciphertext and the fourth ciphertext without decrypting the fifth and fourth ciphertext, and a third bootstrapping of performing a bootstrapping process to output a ninth ciphertext having a value as a plaintext being any value of two values and corresponding to a sum of the full adder using an eighth ciphertext that is an operation result of the third homomorphic operation, wherein the encryption processing device is an encryption processing device which performs fully homomorphic encryption operation to process values on a circle group rotating from 0 to a predetermined value without decrypting the values, wherein the first ciphertext and the second ciphertext are ciphertexts corresponding to a plaintext in which an error is added to 0 or ¼ of the predetermined value, the first homomorphic operation calculates the third ciphertext by adding a first adjustment value that is a positive value corresponding to twice of the error, to an addition result of the first and the second ciphertexts, the first bootstrapping outputs the fourth ciphertext having 0 as a plaintext when a plaintext of the third ciphertext is from 0 to ¼ of the predetermined value, outputs the fourth ciphertext having ¼ of the predetermined value as a plaintext when a plaintext of the third ciphertext is from ¼ of the predetermined value to ½ of the predetermined value and from ¾ of the predetermined value to the predetermined value, and outputs the fourth ciphertext having ½ of the predetermined value as a plaintext when a plaintext of the third ciphertext is from ½ of the predetermined value to ¾ of the predetermined value, the second homomorphic operation calculates the sixth ciphertext by adding a second adjustment ciphertext that is a negative value corresponding to twice of the error, to an addition result of the fifth and the fourth ciphertexts, the second bootstrapping outputs the seventh ciphertext having 0 as a plaintext when a plaintext of the sixth ciphertext is from 0 to ¼ of the predetermined value and from ¾ of the predetermined value to the predetermined value, and outputs the seventh ciphertext having ¼ of the predetermined value as a plaintext when a plaintext of the sixth ciphertext is from ¼ of the predetermined value to ¾ of the predetermined value, and the third bootstrapping outputs the ninth ciphertext having 0 as a plaintext when a plaintext of the eighth ciphertext is from 0 to ¼ of the predetermined value and from ¾ of the predetermined value to the predetermined value, and outputs the ninth ciphertext having ¼ of the predetermined value as a plaintext when a plaintext of the eighth ciphertext is from ¼ of the predetermined value to ¾ of the predetermined value.

2. The encryption processing device according to claim 1, comprising a processor that executes a process comprising:
performing the first homomorphic operation involved in the predetermined operation, for a ciphertext input to the encryption processing device;
performing the first bootstrapping of calculating, based on a first polynomial, the intermediate ciphertext from a result of the first homomorphic operation;
performing the second homomorphic operation involved in the predetermined operation, for the intermediate ciphertext; and
performing the second bootstrapping of calculating, based on a second polynomial, an output ciphertext having two values as a plaintext from a result of the second homomorphic operation.

3. The encryption processing device according to claim 1, wherein the intermediate ciphertext is able to have three values as a plaintext.

4. The encryption processing device according to claim 3, wherein the predetermined operation is an operation by a full adder, and the operation by the full adder is speeded up by using the intermediate ciphertext.

5. The encryption processing device according to claim 2, wherein the predetermined operation is an operation by a full adder, and the operation by the full adder is speeded up by using the intermediate ciphertext.

6. The encryption processing device according to claim 5, wherein by performing the operation by the full adder as the predetermined operation, any of four arithmetic operations is performed with respect to encrypted numerical values that are regarded as ciphertexts of respective bits when a permutation using an input ciphertext is expressed in binary.

7. The encryption processing device according to claim 5, wherein by performing the operation by the full adder as the predetermined operation, processing involved in fuzzy authentication or fuzzy search, which uses an input ciphertext, is performed.

8. The encryption processing device according to claim 5, wherein by performing the operation by the full adder as the predetermined operation, a query to an encryption database based on an input ciphertext is processed.

9. An encryption processing method that processes a ciphertext and is performed by a processor, wherein
the ciphertext is a ciphertext of fully homomorphic encryption that allows a logical operation without decrypting the ciphertext, the logical operation including a homomorphic operation to the ciphertext, and a bootstrapping process to an operation result of the homomorphic operation, and
in a predetermined operation using the ciphertext, number of times of computation required for the predetermined operation is reduced by outputting an intermediate ciphertext having multiple values more than two values as a plaintext by using bootstrapping outputting the multiple values on a homomorphic operation result of the ciphertext having two values as plaintext, as the logical operation, wherein the predetermined operation is an operation of a full adder, wherein
the encryption processing method comprises a process comprising:
a first homomorphic operation of performing operation including a process to add a first ciphertext in which a value corresponding to one-digit binary number is encrypted and a second ciphertext in which a value corresponding to one-digit binary number is encrypted without decrypting the first and second ciphertext, a first bootstrapping of performing a bootstrapping process to output a fourth ciphertext as the intermediate ciphertext corresponding to any one plaintext of three values by using a third ciphertext as input which is an operation result of the first homomorphic operation, a second homomorphic operation of performing operation including a process to add a fifth ciphertext in which value corresponding to one-digit binary number is encrypted and the fourth ciphertext without decrypting the fifth and fourth ciphertext, a second bootstrapping of performing a bootstrapping process to output a seventh ciphertext having a value as a plaintext corresponding to a carry of the full adder using as input a sixth ciphertext that is an operation result of the second homomorphic operation, a third homomorphic operation of performing a process to double a value obtained by adding the fifth ciphertext and the fourth ciphertext without decrypting the fifth and fourth ciphertext, and a third bootstrapping of performing a bootstrapping process to output a ninth ciphertext having a value as a plaintext being any value of two values and corresponding to a sum of the full adder using an eighth ciphertext that is an operation result of the third homomorphic operation, wherein the processor performs fully homomorphic encryption operation to process values on a circle group rotating from 0 to a predetermined value without decrypting the values, wherein the first ciphertext and the second ciphertext are ciphertexts corresponding to a plaintext in which an error is added to 0 or ¼ of the predetermined value, the first homomorphic operation calculates the third ciphertext by adding a first adjustment value that is a positive value corresponding to twice of the error, to an addition result of the first and the second ciphertexts, the first bootstrapping outputs the fourth ciphertext having 0 as a plaintext when a plaintext of the third ciphertext is from 0 to ¼ of the predetermined value, outputs the fourth ciphertext having ¼ of the predetermined value as a plaintext when a plaintext of the third ciphertext is from ¼ of the predetermined value to ½ of the predetermined value and from ¾ of the predetermined value to the predetermined value, and outputs the fourth ciphertext having ½ of the predetermined value as a plaintext when a plaintext of the third ciphertext is from ½ of the predetermined value to ¾ of the predetermined value, the second homomorphic operation calculates the sixth ciphertext by adding a second adjustment ciphertext that is a negative value corresponding to twice of the error, to an addition result of the fifth and the fourth ciphertexts, the second bootstrapping outputs the seventh ciphertext having 0 as a plaintext when a plaintext of the sixth ciphertext is from 0 to ¼ of the predetermined value and from ¾ of the predetermined value to the predetermined value, and outputs the seventh ciphertext having ¼ of the predetermined value as a plaintext when a plaintext of the sixth ciphertext is from ¼ of the predetermined value to ¾ of the predetermined value, and the third bootstrapping outputs the ninth ciphertext having 0 as a plaintext when a plaintext of the eighth ciphertext is from 0 to ¼ of the predetermined value and from ¾ of the predetermined value to the predetermined value, and outputs the ninth ciphertext having ¼ of the predetermined value as a plaintext when a plaintext of the eighth ciphertext is from ¼ of the predetermined value to ¾ of the predetermined value.

10. A non-transitory computer-readable recording medium therein an inference program for causing a processor to execute an encryption processing method that processes a ciphertext, wherein the ciphertext is a ciphertext of fully homomorphic encryption that allows a logical operation without decrypting the ciphertext, the logical operation including a homomorphic operation to the ciphertext, and a bootstrapping process to an operation result of the homomorphic operation, and in a predetermined operation using the ciphertext, number of times of computation required for the predetermined operation is reduced by outputting an intermediate ciphertext having multiple values more than two values as a plaintext by using bootstrapping outputting the multiple values on a homomorphic operation result of the ciphertext having two values as a plaintext, as the logical operation, wherein the predetermined operation is an operation of a full adder, wherein the encryption processing method comprises:

a first homomorphic operation of performing operation including a process to add a first ciphertext in which a value corresponding to one-digit binary number is encrypted and a second ciphertext in which a value corresponding to one-digit binary number is encrypted without decrypting the first and second ciphertext, a first bootstrapping of performing a bootstrapping process to output a fourth ciphertext as an intermediate ciphertext corresponding to any one plaintext of three values by using a third ciphertext as input which is an operation result of the first homomorphic operation, a second homomorphic operation of performing operation including a process to add a fifth ciphertext in which value corresponding to one-digit binary number is encrypted and the fourth ciphertext without decrypting the fifth and fourth ciphertext, a second bootstrapping of performing a bootstrapping process to output a seventh ciphertext having a value as a plaintext corresponding to a carry of the full adder using as input a sixth ciphertext that is an operation result of the second homomorphic operation, a third homomorphic operation of performing a process to double a value obtained by adding the fifth ciphertext and the fourth ciphertext without decrypting the fifth and fourth ciphertext, and a third bootstrapping of performing a bootstrapping process to output a ninth ciphertext having a value as a plaintext being any value of two values and corresponding to a sum of the full adder using an eighth ciphertext that is an operation result of the third homomorphic operation, wherein the processor performs fully homomorphic encryption operation to process values on a circle group rotating from 0 to a predetermined value without decrypting the values, wherein the first ciphertext and a second ciphertext are ciphertexts corresponding to a plaintext in which an error is added to 0 or ¼ of the predetermined value, the first homomorphic operation calculates the third ciphertext by adding a first adjustment value that is a positive value corresponding to twice of the error, to an addition result of the first and the second ciphertexts, the first bootstrapping outputs the fourth ciphertext having 0 as a plaintext when a plaintext of the third ciphertext is from 0 to ¼ of the predetermined value, outputs the fourth ciphertext having ¼ of the predetermined value as a plaintext when a plaintext of the third ciphertext is from ¼ of the predetermined value to ½ of the predetermined value and from ¾ of the predetermined value to the predetermined value, and outputs the fourth ciphertext having ½ of the predetermined value as a plaintext when a plaintext of the third ciphertext is from ½ of the predetermined value to ¾ of the predetermined value, the second homomorphic operation calculates the sixth ciphertext by adding a second adjustment ciphertext that is a negative value corresponding to twice of the error, to an addition result of a fifth and a fourth ciphertexts, the second bootstrapping outputs the seventh ciphertext having 0 as a plaintext when a plaintext of the sixth ciphertext is from 0 to ¼ of the predetermined value and from ¾ of the predetermined value to the predetermined value, and outputs the seventh ciphertext having ¼ of the predetermined value as a plaintext when a plaintext of the sixth ciphertext is from ¼ of the predetermined value to ¾ of the predetermined value, and the third bootstrapping outputs the ninth ciphertext having 0 as a plaintext when a plaintext of the eighth ciphertext is from 0 to ¼ of the predetermined value and from ¾ of the predetermined value to the predetermined value, and outputs the ninth ciphertext having ¼ of the predetermined value as a plaintext when a plaintext of the eighth ciphertext is from ¼ of the predetermined value to ¾ of the predetermined value.

\* \* \* \* \*